(12) United States Patent
Ogawa

(10) Patent No.: US 11,551,545 B2
(45) Date of Patent: Jan. 10, 2023

(54) TAG MEASUREMENT ENVIRONMENT EVALUATION DEVICE

(71) Applicant: DENSO WAVE INCORPORATED, Chita (JP)

(72) Inventor: Masayuki Ogawa, Chita-gun (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 88 days.

(21) Appl. No.: 17/160,537

(22) Filed: Jan. 28, 2021

(65) Prior Publication Data

US 2021/0248902 A1 Aug. 12, 2021

(30) Foreign Application Priority Data

Feb. 12, 2020 (JP) .............................. JP2020-021749

(51) Int. Cl.
*G08C 15/10* (2006.01)
*G06K 7/10* (2006.01)
*H04W 4/38* (2018.01)

(52) U.S. Cl.
CPC ......... *G08C 15/10* (2013.01); *G06K 7/10029* (2013.01); *G06K 7/10128* (2013.01); *G06K 7/10138* (2013.01); *H04W 4/38* (2018.02)

(58) Field of Classification Search
None
See application file for complete search history.

(56) References Cited

U.S. PATENT DOCUMENTS

| | | | | |
|---|---|---|---|---|
| 9,805,232 B2* | 10/2017 | Sample | ............... | G06Q 30/0251 |
| 10,133,894 B2* | 11/2018 | Kruest | ............... | G06K 7/10029 |
| 10,467,873 B2* | 11/2019 | Chen | ....................... | G06N 20/00 |
| 10,503,938 B2* | 12/2019 | Enomoto | ............ | G06K 7/10425 |
| 10,796,110 B2* | 10/2020 | Suzuki | ................ | G06K 7/10108 |
| 11,030,424 B2* | 6/2021 | Ogawa | ................ | G06K 7/10099 |
| 11,049,279 B2* | 6/2021 | Yoda | ..................... | G06K 7/1417 |
| 11,067,960 B2* | 7/2021 | Jahn | .................. | G05B 19/41865 |
| 11,276,107 B2* | 3/2022 | Uchimura | ............. | G06Q 10/087 |
| 2008/0129461 A1* | 6/2008 | Abraham | ............ | G06K 19/0723 340/10.1 |
| 2014/0167920 A1* | 6/2014 | Kamiya | .................. | G01S 13/58 340/10.1 |
| 2019/0102584 A1* | 4/2019 | Enomoto | ............ | G06K 7/10366 |
| 2019/0108370 A1* | 4/2019 | Trivelpiece | ........... | G06K 7/0008 |
| 2019/0138768 A1* | 5/2019 | Leland | ................ | G06K 7/10316 |
| 2019/0220844 A1* | 7/2019 | Trivelpiece | ........ | G06K 7/10029 |
| 2019/0303631 A1* | 10/2019 | Ogawa | ................ | G06K 7/10099 |
| 2019/0362215 A1* | 11/2019 | Khoche | ............ | G06K 19/07773 |
| 2020/0285817 A1* | 9/2020 | Roth | ................... | G06K 7/10445 |
| 2021/0248902 A1* | 8/2021 | Ogawa | .................. | G08C 15/10 |

FOREIGN PATENT DOCUMENTS

WO WO-2018004086 A2 * 1/2018 .......... H04J 13/0062

* cited by examiner

*Primary Examiner* — Fekadeselassie Girma

(74) *Attorney, Agent, or Firm* — Oliff PLC

(57) ABSTRACT

A tag measurement environment evaluation device includes a processor and a memory storing a program. The program is configured to, when executed by the processor, cause the processor to determine a moving tag evaluation value of each of a plurality of wireless tags based on a radio wave transmitted from each of the wireless tags and received by a tag reader configured to communicate with each of the wireless tags, and determine whether a measurement environment is suitable for a moving tag detection based on the moving tag evaluation values.

5 Claims, 16 Drawing Sheets

| MOVING TAG EVALUATION VALUE | EVALUATION VALUE WHEN WIRELESS TAG IS MOVING TAG |
|---|---|
| PHASE CHANGE AMOUNT | CHANGE AMOUNT IS LARGE |
| PHASE DEVIATION | DEVIATION IS SMALL |
| DOPPLER FREQUENCY | VALUES (AVERAGE VALUE, MODE VALUE, ABSOLUTE VALUE) ARE HIGH |
| RSSI CHANGE AMOUNT | CHANGE AMOUNT IS LARGE |
| RSSI MAXIMUM VALUE | MAXIMUM VALUE IS HIGH |
| PHASE INVERSION TIME | VARIATION IS SMALL |

| NO. | MEASUREMENT ENVIRONMENT INDEX | CLASS | N NUMBER | MOVING TAG EVALUATION REPRESENTATIVE VALUE | DETERMINATION RESULT |
|---|---|---|---|---|---|
| | | | | AVERAGE PHASE CHANGE AMOUNT | |
| 1 | MAXIMUM RSSI [dBm] | −50 OR MORE | 50 | 3000 | THERE IS INFLUENCE |
| | | −60 OR LESS | 50 | 1000 | |
| 2 | SPEED [km/h] | 2 OR LESS | 100 | 2000 | THERE IS NO INFLUENCE |
| | | 4 OR MORE | 100 | 1500 | |
| 3 | NUMBER OF MOVING TAGS | 16 OR MORE | 200 | 1500 | THERE IS INFLUENCE |
| | | 8 OR LESS | 10 | 3500 | |

| CLASS | TRIAL NUMBER | ACQUIRED DATE | SPEED [km/h] | TAG ID | TAG TYPE | PHASE CHANGE AMOUNT [deg] | PHASE DEVIATION [%] |
|---|---|---|---|---|---|---|---|
| SLOW SPEED | FIRST | 20190606 1442 | 1 | 1000 | STOP | 500 | ... |
| | | | | 1001 | MOVING | 2000 | ... |
| | | | | 1002 | MOVING | 2500 | ... |
| HIGH SPEED | SECOND | 20190606 1445 | 6 | 2000 | STOP | 100 | ... |
| | | | | 2001 | MOVING | 700 | ... |
| | | | | 2002 | MOVING | 1200 | ... |
| MEDIUM SPEED | THIRD | 20190606 1448 | 5 | 3000 | STOP | 200 | ... |
| | | | | 3001 | MOVING | 900 | ... |
| | | | | 3002 | MOVING | 1400 | ... |

FIG. 25

| DIFFERENCES WITH OTHER TRIALS | POSSIBLE CAUSE | EXAMPLE OF SOLUTION |
|---|---|---|
| ADVANTAGE<br>  PHASE CHANGE AMOUNTS OF MOVING TAGS ARE HIGH | MOVING TAGS PASS AREA WHERE ANTENNA READING IS GOOD | |
| ADVANTAGE<br>  PHASE DEVIATIONS ARE GOOD | MOVING TAGS PASS STRAIGHT AT CONSTANT SPEED | |
| DISADVANTAGE<br>  PHASE CHANGE AMOUNTS OF A PART OF STOP TAGS ARE HIGH | STOP TAGS ARE PRESENT NEAR BACK OF ANTENNA | ・MOVE STOP TAGS AWAY FROM ANTENNA<br>・DISPOSE RADIO WAVE SHIELD MEMBER BETWEEN STOP TAGS AND ANTENNA |

FIG. 26

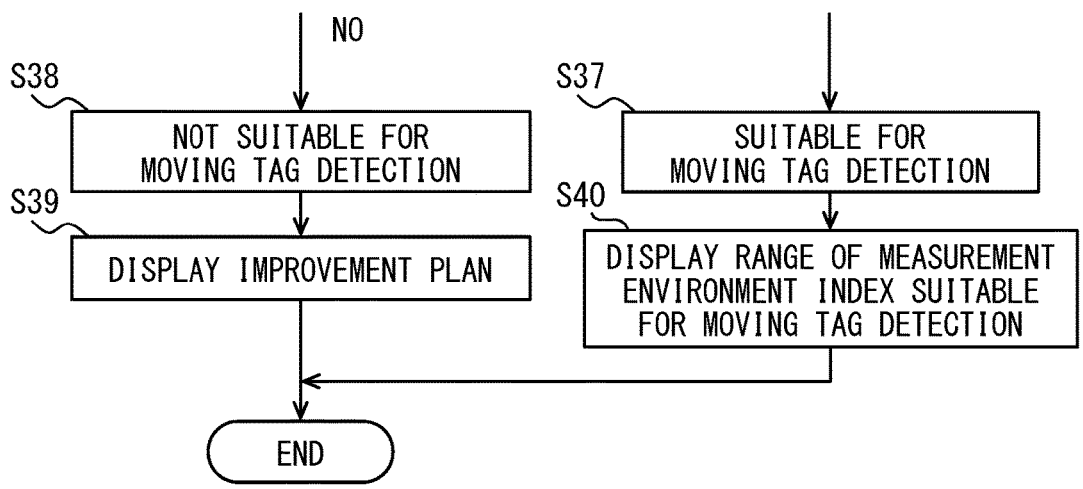

TAG MEASUREMENT ENVIRONMENT EVALUATION DEVICE

CROSS REFERENCE TO RELATED APPLICATION

The present application claims the benefit of priority from Japanese Patent Application No. 2020-021749 filed on Feb. 12, 2020. The entire disclosure of the above application is incorporated herein by reference.

TECHNICAL FIELD

The present disclosure relates to a tag measurement environment evaluation device.

BACKGROUND

Conventionally, there has been known a tag measurement environment evaluation device for evaluating whether the measurement environment is suitable for distinguishing between moving tags and stop tags.

SUMMARY

A tag measurement environment evaluation device according to an aspect of the present disclosure includes a processor and a memory storing a program. The program is configured to, when executed by the processor, cause the processor to determine a moving tag evaluation value of each of a plurality of wireless tags based on a radio wave transmitted from each of the wireless tags and received by a tag reader configured to communicate with each of the wireless tags, and determine whether a measurement environment is suitable for a moving tag detection based on the moving tag evaluation values.

BRIEF DESCRIPTION OF DRAWINGS

Objects, features and advantages of the present disclosure will become apparent from the following detailed description made with reference to the accompanying drawings. In the drawings:

FIG. 25 is a diagram illustrating a difference between the data of the first trial and the data of other trials;

FIG. 26 is a diagram showing a process executed by an evaluation device in an eighth embodiment;

DETAILED DESCRIPTION

Figure 1:
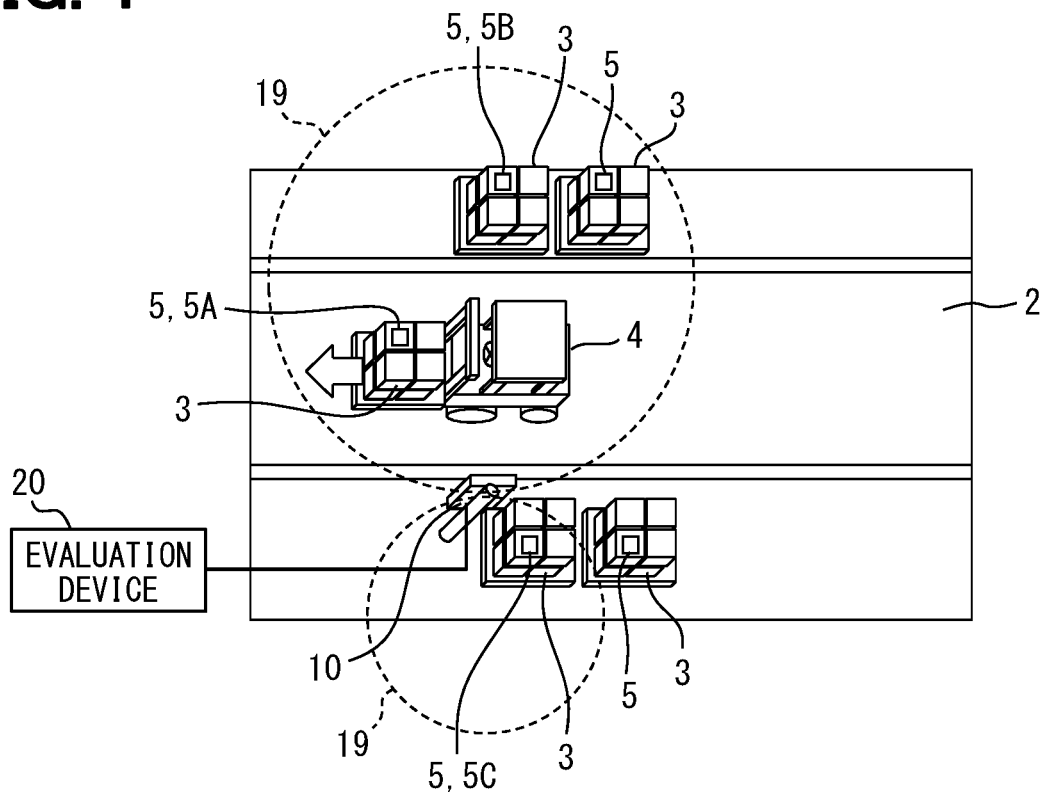
FIG. 1 is a diagram showing a usage state of a tag reader.

Whether a tag is a moving tag or a stationary tag can be determined, for example, based on characteristics of time-series data of radio wave reception intensity, phase, and Doppler frequency of radio waves from the tag. Further, in order to determine a tag that is erroneously determined to be a stationary tag as a moving tag, a parameter can be changed.

In cases where it is determined whether an individual wireless tag is a moving tag or a stop tag, it is troublesome to determine whether a measurement environment is suitable for detecting the moving tag.

A tag measurement environment evaluation device according to an aspect of the present disclosure includes a processor and a memory storing a program. The program is configured to, when executed by the processor, cause the processor to determine a moving tag evaluation value of each of a plurality of wireless tags based on a radio wave transmitted from each of the wireless tags and received by a tag reader configured to communicate with each of the wireless tags. The wireless tags include one or more moving tags that move and one or more stop tags that stop. The moving tag evaluation value is a value indicating how much each of the wireless tags is likely to be the moving tag. The program is further configured to, when executed by the processor, cause the processor to determine a moving tag evaluation representative value that is a representative value of the moving tag evaluation values of the wireless tags, and determine, based on the moving tag evaluation representative value, whether a measurement environment is suitable for a moving tag detection in which the moving tags are detected while being distinguished from the stop tags.

By using the moving tag evaluation representative value, which is the representative value of the moving tag evaluation values determined for the plurality of wireless tags, it is easier to determine whether the measurement environment is suitable for the moving tag detection than a case where it is determined whether an individual moving tag is recognized as a moving tag.

A tag measurement environment evaluation device according to another aspect of the present disclosure includes a processor and a memory storing a program. The program is configured to, when executed by the processor, cause the processor to determine a moving tag evaluation value of each of a plurality of wireless tags based on a radio wave transmitted from each of the wireless tags and received by a tag reader configured to communicate with each of the wireless tags. The wireless tags include one or more moving tags that move and one or more stop tags that stop. The moving tag evaluation value is a value indicating how much each of the wireless tags is likely to be the moving tag. The program is further configured to, when executed by the processor, cause the processor to determine a feature of a distribution of the moving tag evaluation values of the moving tags as a moving tag evaluation feature value of the moving tags, determine a feature of a distribution of the moving tag evaluation values of the stop tags as a moving tag evaluation feature value of the stop tags, calculate an inter-distribution distance that indicates a degree of separation between the moving tag evaluation feature value of the moving tags and the moving tag evaluation feature value of the stop tags, and determine whether a measurement environment is suitable for a moving tag detection, in which the moving tags are detected while being distinguished from the stop tags, by determining whether the inter-distribution distance is larger than a predetermined threshold value.

In the above-described tag measurement environment evaluation device, whether the distribution of the moving tag evaluation values of the moving tags and the distribution of the moving tag evaluation values of the stop tags can be distinguish from each other is determined by calculating the inter-distribution distance. Accordingly, it is easily and accurately determine whether the measurement environment is suitable for the moving tag detection.

First Embodiment

[Example of Usage State]

FIG. 1 shows a usage state of a tag reader 10. In a usage example shown in FIG. 1, the tag reader 10 is installed beside a passage 2 and is used to detect that a luggage 3 is carried by a moving body such as a forklift 4 and has passed through the passage 2. The luggage 3 is attached with a wireless tag 5, and the tag reader 10 detects that the wireless tag 5 attached to the luggage 3 carried by the forklift 4 or the like is moving.

In order to detect the wireless tag 5, the tag reader 10 sequentially transmits a search wave. The wireless tag 5 is a passive type, operates by receiving the search wave, and transmits a response wave. The tag reader 10 can detect the wireless tag 5 by receiving the response wave transmitted by the wireless tag 5. Hereinafter, a radio wave transmitted by the wireless tag 5 and received by the tag reader 10 is referred to as a received wave.

If the tag reader 10 can detect that the wireless tag 5 is moving and then the tag reader 10 can no longer detect the wireless tag 5, the tag reader 10 can detect that the luggage 3 to which the wireless tag 5 is attached has passed through the passage 2. However, the luggage 3 to which the wireless tag 5 is attached may be temporarily placed beside the passage 2. The wireless tag 5 attached to the luggage 3 placed beside the passage 2 also responds to the search wave transmitted by the tag reader 10.

Therefore, the tag reader 10 has a function of identifying whether the wireless tag 5 that has transmitted the received wave is the wireless tag 5 that is moving (that is, a moving tag) or the wireless tag 5 that stops (that is, a stop tag).

An evaluation device 20 is a tag measurement environment evaluation device that evaluates whether the tag reader 10 is in a measurement environment suitable for distinguishing between a moving tag and a stop tag. The evaluation device 20 is connected to the tag reader 10 and acquires a signal indicating the received wave or a moving tag evaluation value. Then, the evaluation device 20 evaluates whether the measurement environment is suitable for distinguishing the moving tag and the stop tag based on the moving tag evaluation value. The evaluation device 20 can be realized by a computer equipped with a central processing unit (CPU), a read-only memory (ROM), and a random access memory (RAM), and the like.

[Configuration of Tag Reader 10]

Figure 2:
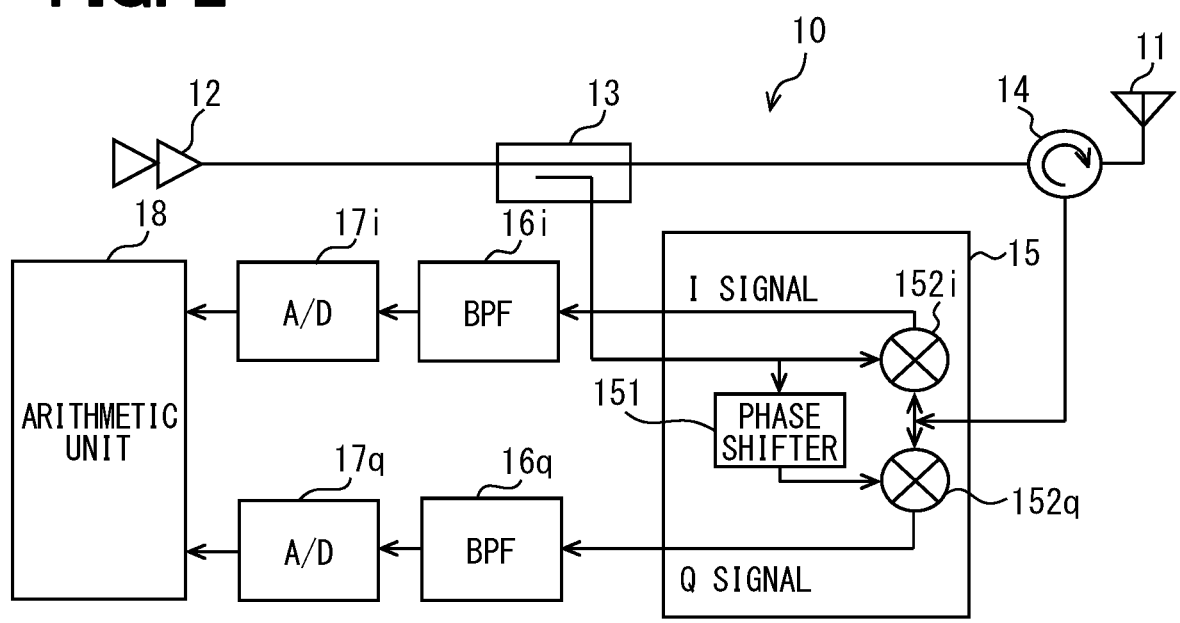
FIG. 2 is a diagram showing a configuration of the tag reader.

FIG. 2 shows a configuration of the tag reader 10. The tag reader 10 includes an antenna 11, a transmitter 12, a coupler 13, an antenna duplexer 14, an orthogonal demodulator 15, bandpass filters 16$i$ and 16$q$, AD converters 17$i$ and 17$q$, and an arithmetic unit 18.

The antenna 11 has a communication range 19 including a portion of the passage 2 in front of the antenna 11 (see FIG. 1). However, since it is difficult to set the communication range 19 only in the portion where the passage 2 is located, a portion opposite from the passage 2 when viewed from the tag reader 10 and a portion beyond the passage 2 when viewed from the tag reader 10 are also included in the communication range 19.

The transmitter 12 generates and outputs a search signal, which is a signal representing the search wave to be transmitted toward the wireless tag 5. This signal is branched by the coupler 13 and is input to the antenna duplexer 14 and the orthogonal demodulator 15. The antenna duplexer 14 outputs the signal from the transmitter 12 to the antenna 11, and outputs a received signal representing the received wave received by the antenna 11 to the orthogonal demodulator 15. The antenna 11 radiates the search wave into the air and receives the radio wave from the wireless tag 5.

The received wave received by the antenna 11 is input to the orthogonal demodulator 15. The orthogonal demodulator 15 includes a phase shifter 151 and two mixers 152$i$ and 152$q$. The phase shifter 151 receives the search signal branched by the coupler 13. The mixer 152$i$ receives the received signal and the search signal. When the received signal and the search signal are mixed by the mixer 152$i$, an I signal, which is an in-phase component of a baseband signal, is obtained. The mixer 152$q$ receives the received signal and the search signal whose phase $\Phi$ is 90 degrees shifted by the phase shifter 151. From this mixer 152$q$, a Q signal which is an orthogonal component of the baseband signal can be obtained.

The signal obtained by the mixer 152$i$ is input to the arithmetic unit 18 via the bandpass filter 16$i$ and the AD converter 17$i$, and the signal obtained by the mixer 152$q$ is input to the arithmetic unit 18 via the bandpass filter 16$q$ and the AD converter 17$q$.

The arithmetic unit 18 is a computer provided with a CPU, a ROM, a RAM, and the like, and the CPU executes a program stored in a storage medium such as the ROM while using a temporary storage function of the RAM to execute a moving tag determination process. The moving tag determination process is performed using the moving tag evaluation value evaluated to be suitable for moving tag detection.

[Configuration of Evaluation Device 20]

Figure 3:
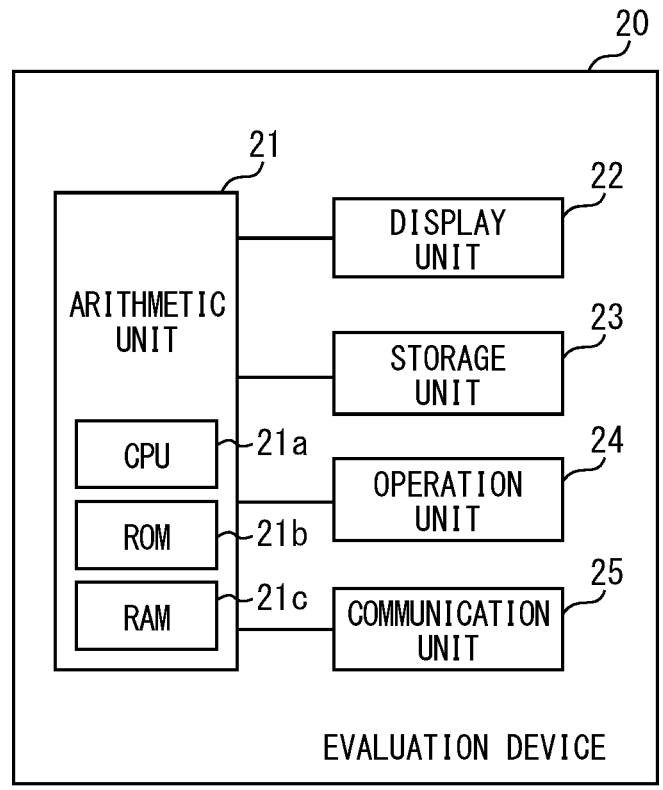
FIG. 3 is a diagram showing a configuration of an evaluation device.

As shown in FIG. 3, the evaluation device 20 includes an arithmetic unit 21, a display unit 22, a storage unit 23, an operation unit 24, a communication unit 25, and the like. The arithmetic unit 21 has a configuration including a CPU 21a, a ROM 21b, a RAM 21c, and the like. The CPU 21a is an example of a processor, and the ROM 21b and the RAM 21c are examples of memories. The CPU 21a executes various programs stored in the ROM 21b while using a temporary storage function of the RAM 21c to control the display unit 22, the storage unit 23, the operation unit 24, and the communication unit 25. The display unit 22 is a liquid crystal monitor or the like, and displays a result of evaluating the measurement environment or the like. The storage unit 23 includes a writable storage medium such as a flash memory. The operation unit 24 is a mouse, a keyboard, or the like, and is operated by a user to input the measurement environment. The communication unit 25 is a communication interface for performing data communication with an external device such as the tag reader 10 or a host device.

[Measurement Environment Evaluation]

Figure 4:
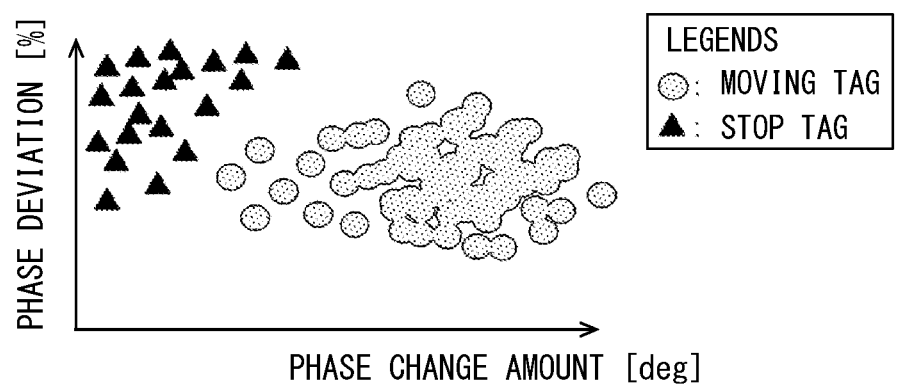
FIG. 4 is a diagram plotting phase change amounts and phase deviations of moving tags and stop tags.

Next, a method of the evaluation device 20 evaluating whether the measurement environment is suitable for distinguishing between moving tags and the stop tags will be described. FIG. 4 is a diagram plotting results of calculating phase change amounts and phase deviations for a plurality of moving tags and a plurality of stop tags. In FIG. 4, the phase change amounts and the phase deviations are calculated by variously changing the moving speed of the moving tags. The phase change amount and the phase deviation are examples of the moving tag evaluation values.

The moving tag evaluation values are evaluation values different between moving tags and stop tags. In other words, the moving tag evaluation values are values indicating the uniqueness of moving tags. The phase change amount is calculated from the time-series data of a phase Φ of the received wave sequentially received by the tag reader 10 from the wireless tag 5. The time-series data is data in which the phase Φ of the received wave is associated with an acquisition time when the received wave is acquired. The phase Φ of the received wave is calculated from Mathematical Expression 1. In Mathematical Expression 1, AQ is an amplitude of the Q signal and AI is an amplitude of the I signal.

$$\Phi = \tan^{-1}(AQ/AI) \quad \text{(Mathematical Expression 1)}$$

The phase Φ shall be calculated as a value of 0 to 180 degrees. That is, the phase range that can be calculated is 180 degrees. However, unlike this, the phase Φ may be calculated as a value of 0 to 360 degrees.

The phase change amount is an integral value of a phase difference obtained sequentially while a moving tag moves from a certain start angle to an end angle with the tag reader 10 as the center of polar coordinates. The start angle and the end angle may be any angle. For example, one end of the angle range in which the tag reader 10 should detect a moving tag can be the start angle, and the other end can be the end angle.

However, the wireless tag 5 may be a stop tag. The stop tag does not move from the start angle to the end angle. In order to evaluate whether the measurement environment is suitable for the moving tag detection, it is necessary to calculate the phase change amount for the stop tag as well. Since the moving speed of the moving tag is known when evaluating the measurement environment, the time for the moving tag to move from the start angle to the end angle can be calculated. Therefore, the phase change amount is an integral value of the phase difference obtained sequentially in an evaluation value calculation time corresponding to the time when the moving tag moves from the start angle to the end angle.

As shown in FIG. 4, the phase change amount changes even of the stop tag.

The reason why the phase change amount of the stop tag changes is that reflected wave is generated through a moving objects as the responses wave from the stop tag. Since the path length of the reflected wave via the moving object changes according to the movement of the object, the phase also changes according to the movement of the object. Therefore, the phase change amount, which is the integrated value of the phase difference, also changes depending on the position of the object that generates the reflected wave, even if it is the stop tag.

In this way, the phase change amount changes even of the stop tag. However, as can be seen from FIG. 4, the phase change amount of the stop tag is relatively small as compared with the phase change amount of the moving tag. Therefore, the phase change amount is one of the moving tag evaluation values.

The phase deviation is a value indicating how much the phase Φ that can be sequentially calculated during the evaluation value calculation time is deviated. The phase deviation is calculated using Mathematical Expression 2 as an example.

$$\text{Phase deviation (\%)} = \text{(the number of measurement points whose phases are in a deviation range/the total number of measurement points)} \times 100 \quad \text{(Mathematical Expression 2)}$$

In Mathematical Expression 2, the deviation range is a range in which the phase is deviated when the wireless tag 5 is the stop tag, and is set by the user by looking at a graph plotting the time change of the phase Φ. Alternatively, a range such as a 90 degree range of 0 to 90 degrees may be set in advance. In the case of the moving tag, the phase Φ changes from about 0 to 180 degrees, so that the phase deviation becomes a low value such as 50%. On the other hand, in the phase Φ of the stop tag, since a direct wave and the reflected wave from the stop tag exist as the response wave, a composite wave in which the direct wave and the reflected wave are combined is weakened in a certain phase range. As a result, the composite wave is not observed in the certain phase range, so the phase change range is not as wide as that of the moving tag. That is, the phase Φ does not vary as much as the moving tag. Therefore, the phase deviation is one of the moving tag evaluation values.

[Specific Examples of Moving Tag Evaluation Values]

Figures 5, 6:
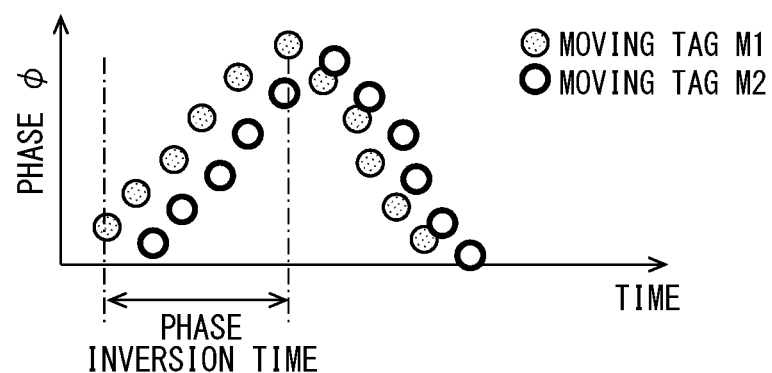
FIG. 5 is a diagram showing specific examples of moving tag evaluation values.
FIG. 6 is a diagram illustrating a phase inversion time.

FIG. 5 shows specific examples of the moving tag evaluation values and the tendencies of the evaluation values when the wireless tag is a moving tag. As described above, when the wireless tag 5 is the moving tag, the phase change amount is large. When the wireless tag 5 is the moving tag, the phase deviation is small. In FIG. 5, in addition to the phase change amount and the phase deviation, a Doppler frequency, an RSSI change amount, an RSSI maximum value, and a phase inversion time are shown as moving tag evaluation values.

The Doppler frequency is a Doppler frequency of the response wave from the wireless tag 5. When the wireless tag 5 is the moving tag, the Doppler frequency becomes high. Therefore, the values such as the average value, the mode value, and the absolute value of the Doppler frequency are high. The RSSI change amount is a difference between the maximum value and the minimum value of RSSI within the above-described evaluation value calculation time. When the wireless tag 5 is the moving tag, the RSSI change amount becomes large. The RSSI maximum value is the maximum value of RSSI within the above-described evaluation value calculation time. When the wireless tag 5 is the moving tag, the RSSI maximum value becomes high.

The phase inversion time will be described with reference to FIG. 6. FIG. 6 plots the relationship between the time and the phases of the moving tag M1 and the moving tag M2. The phase inversion time is the time from when the phase Φ can be calculated for each wireless tag 5 until the change tendency of the phase Φ is inverted. The variation in the phase inversion time is small between the moving tags.

It should be noted that no matter what kind of moving tag evaluation value is used for the same measurement environment, the determination result of whether the measurement environment is suitable for the moving tag detection is not the same. Depending on the measurement environment, one moving tag evaluation value may be suitable for moving tag detection, but another moving tag evaluation value may not be suitable for the moving tag detection.

Figure 7:
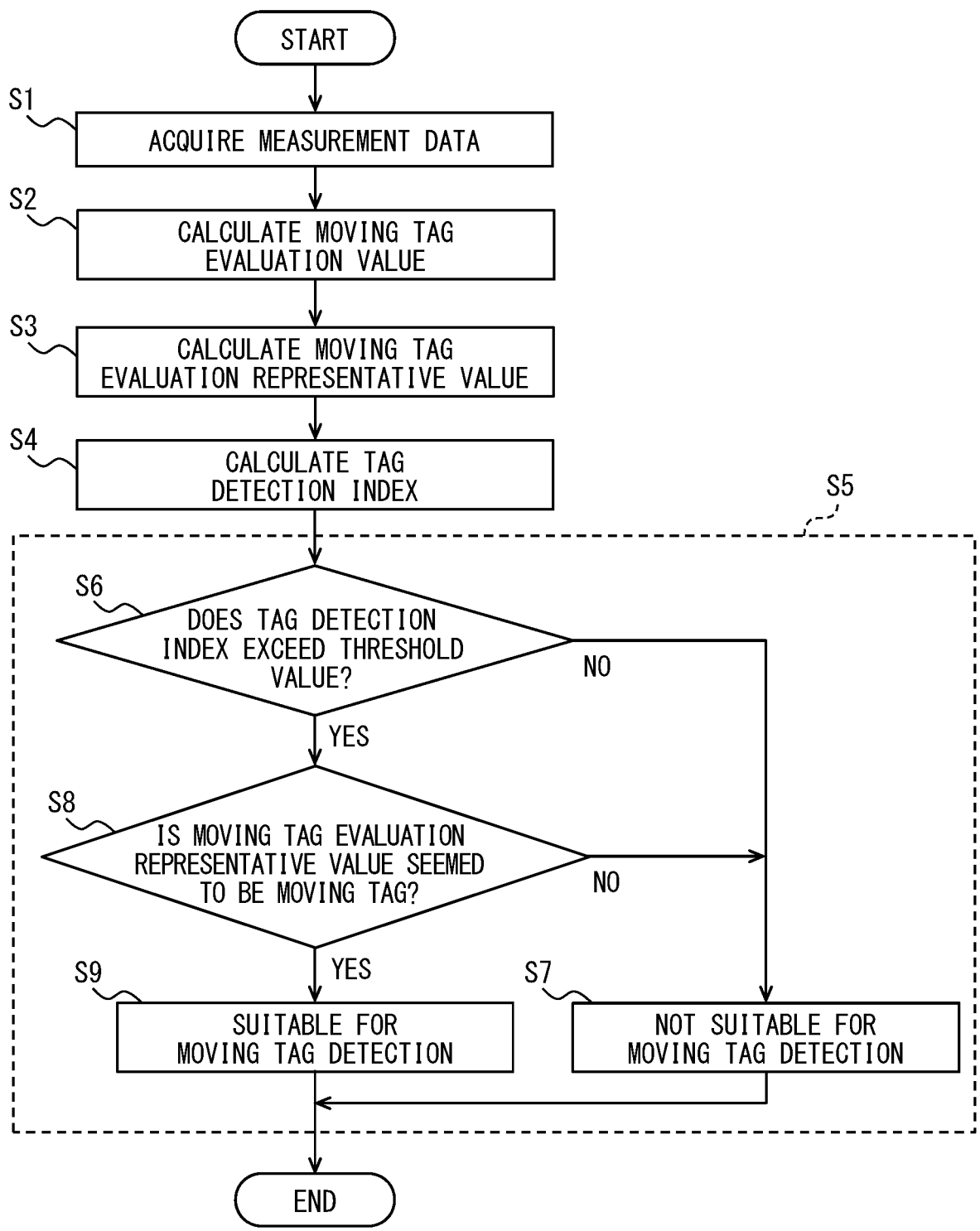
FIG. 7 is a diagram showing a process executed by the evaluation device in the first embodiment.

FIG. 7 is a flowchart showing an example of a process executed by the evaluation device 20 when determining whether the measurement environment is suitable for the moving tag detection. For example, the process shown in FIG. 7 is executed by the CPU 21a in the arithmetic unit 21 by executing a program stored in the ROM 21b. When the evaluation device 20 executes the process shown in FIG. 7, in order to evaluate the measurement environment, the evaluation device 20 instructs the tag reader 10 to measure the I signal and the Q signal of each wireless tag 5 in the measurement environment as illustrated in FIG. 1. The evaluation of the measurement environment in the first embodiment is performed using only the moving tag. In the first embodiment, it is determined whether the moving tag evaluation value calculated for the moving tag is a value that is difficult to be indicated by the moving tag evaluation value of the stop tag. In S1, the I signal and the Q signal of each wireless tag 5 are acquired from the tag reader 10. The process of S1 may be sequentially performed while the tag reader 10 is measuring the I signal and the Q signal, and the I signal and the Q signal of the wireless tag 5 may be sequentially acquired. In another example, the tag reader 10 may store the I signals and the Q signals of a plurality of wireless tags 5, and in S1, the evaluation device 20 may collectively acquire the I signals and the Q signals of the plurality of wireless tags 5 from the tag reader 10.

In S2, which corresponds to an evaluation value determination section, the moving tag evaluation value is calculated for each wireless tag 5 based on the signals acquired in S1. As described above, there is a plurality of types of moving tag evaluation values. In this S2, one or more kinds of predetermined moving tag evaluation values are calculated.

In S3, which corresponds to a representative value determination section, the moving tag evaluation representative value is calculated. The moving tag evaluation representative value is a representative value of the moving tag evaluation values calculated for the plurality of wireless tags 5 in S2. The moving tag evaluation representative value is, for example, the average value, the median value, the mode value, or the like of the moving tag evaluation values.

In S4, a tag detection index is calculated based on the signals acquired in S1. The tag detection index is an index indicating the ease of detection of the wireless tag 5 regardless of whether the wireless tag 5 is the moving tag or the stop tag. The tag detection index is, for example, the number of times of reading one wireless tag 5. This is because if the number of times of reading one wireless tag 5 is small, the accuracy of the moving tag evaluation value such as the phase change amount and the phase deviation cannot be guaranteed.

Further, although the RSSI maximum value and the RSSI change amount have been described as the moving tag evaluation values, the RSSI maximum value and the RSSI change amount are tag detection indexes for only moving tags. This is because it is difficult to detect the moving tag when the RSSI maximum value of the moving tag is low. Further, when the RSSI maximum value of the moving tag is small, the RSSI change amount is also small. Therefore, the RSSI change amount of the moving tag can also be used as the tag detection index.

S5 corresponds to an environmental evaluation section. Specifically, S5 includes processes of S6 to S9. In S6, it is determined whether the tag detection index calculated in S4 exceeds a threshold value. The threshold value is predetermined for each tag detection index. When a plurality of types of tag detection indexes are calculated in S4, the tag detection indexes are compared with the threshold values, respectively. When comparing the plurality of types of tag detection indexes with the threshold values, if the ratio of the number of tag detection indexes exceeding the threshold values to the number of types for which the tag detection indexes are calculated is equal to or greater than a threshold value set for S6, the determination result of S6 is set to YES. On the other hand, if the ratio is smaller than the threshold value set for S6, the determination result of S6 is set to NO. If the determination result of S6 is NO, the process proceeds to S7.

In S7, it is determined that the measurement environment is not suitable for the moving tag detection, and the display unit 22 indicates that the measurement environment is not suitable for the moving tag detection. If the determination result in S6 is NO, it can be said that the measurement environment is not suitable for detecting the wireless tag 5 regardless of whether the wireless tag 5 is a moving tag or a stop tag.

If the determination result of S6 is YES, the process proceeds to S8. In S8, it is determined whether the moving tag evaluation representative value calculated in S3 is a value that is likely to be a moving tag. Specifically, the threshold value set in advance for each type of the moving tag evaluation representative value is compared with the moving tag evaluation representative value, and whether the moving tag evaluation representative value is on a value side indicated when the wireless tag is the moving tag with respect the threshold value. When the plurality of types of moving tag evaluation representative values are calculated in S3, the moving tag evaluation representative values are compared with the threshold values, respectively. When comparing the plurality of types of moving tag evaluation representative values with the threshold values, the ratio of the number of moving tag evaluation representative values exceeding the threshold values to the number of types for which the moving tag evaluation representative values are calculated exceeds a threshold value set for S8, the determination result of S8 is set to YES. On the other hand, if the ratio is smaller than the threshold value set for S8, the determination result of S8 is set to NO. This ratio may be 100%, that is, the condition that the determination result of S8 is set to YES may be that all the calculated moving tag evaluation representative values are values that are likely to be the moving tags. If the determination result of S8 is NO, the process proceeds to S7. When the determination result of S8 is NO and the process proceeds to S7, there is no problem as an environment for detecting the existence of the wireless tag 5, but it can be said that the measurement environment is not suitable for distinguishing between the moving tags and the stop tags.

If the determination result of S8 is also YES, the process proceeds to S9. In S9, it is determined that the measurement environment is suitable for the moving tag detection, and the display unit 22 is instructed to display that the measurement environment is suitable for the moving tag detection.

[Summary of First Embodiment]

In the first embodiment, the moving tag evaluation representative value is calculated in order to determine whether the measurement environment is suitable for the moving tag detection (S3). The moving tag evaluation representative value indicates the characteristics of the moving tag evaluation value calculated for the plurality of wireless tags 5. Based on this moving tag evaluation representative value, it is determined whether the measurement environment is suitable for the moving tag detection (S8).

Since it is determined whether the measurement environment is suitable for the moving tag detection as described above, it is possible to easily determine the suitability of the measurement environment rather than determining whether each moving tag is recognized as a moving tag.

Second Embodiment

Next, a second embodiment will be described. In the description of the second and subsequent embodiments, elements having the same reference numerals as those used so far are identical to the elements having the same reference numerals in the previous embodiment(s), unless otherwise specified. When only a part of the configuration is described, the embodiment described above can be applied to other parts of the configuration.

Figure 8:
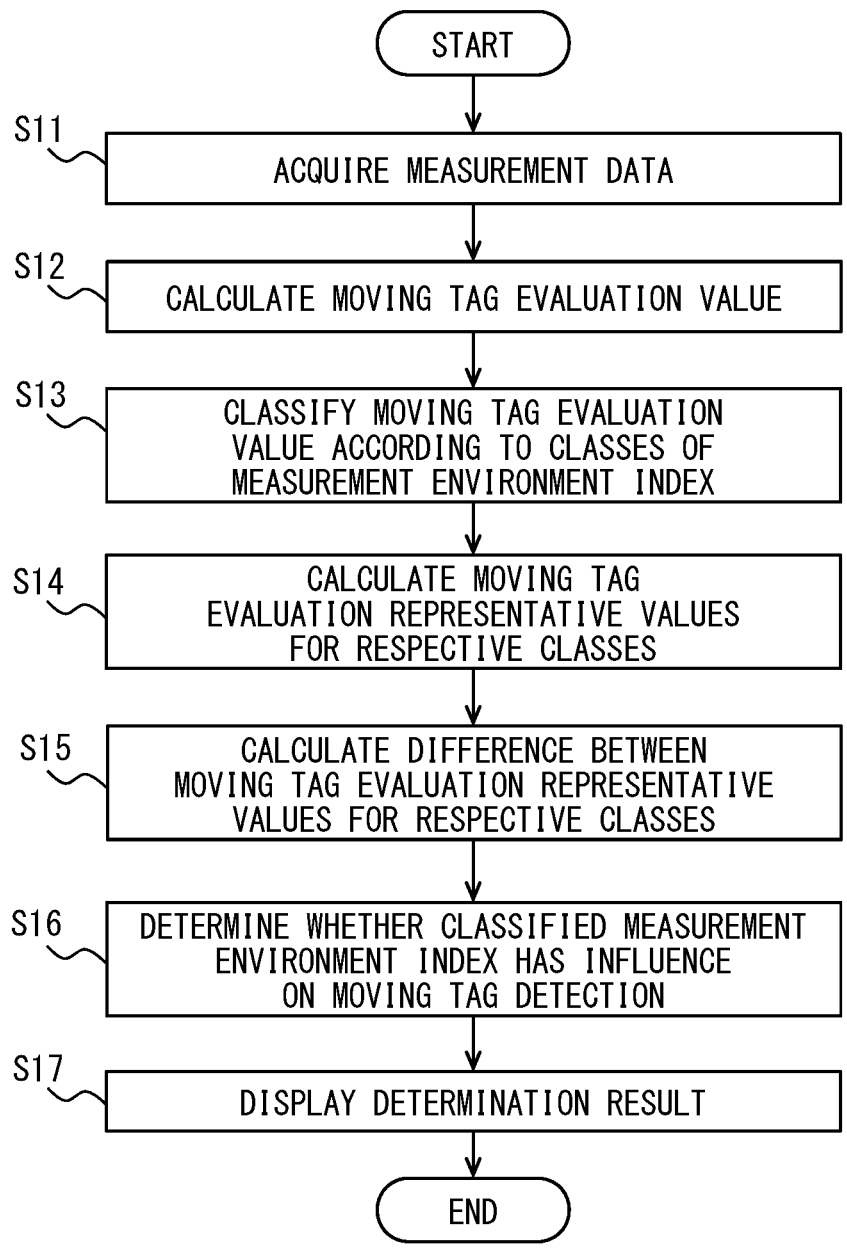
FIG. 8 is a diagram showing a process executed by an evaluation device in a second embodiment.

FIG. 8 shows a process of determining the suitability of moving tag detection, which is executed by the evaluation device 20 in place of FIG. 7 in the second embodiment. For example, the process shown in FIG. 8 is executed by the CPU 21a in the arithmetic unit 21 by executing a program stored in the ROM 21b. The process shown in FIG. 8 is also a process for determining the suitability of the moving tag detection, and in particular, is a process for determining the influence of the measurement environment index described below.

S11 and S12 are the same as S1 and S2, respectively, and in S12, the moving tag evaluation value is calculated. Therefore, S12 corresponds to the evaluation value determination section. In S13, the moving tag evaluation value calculated in S12 is classified according to class of the measurement environment index. The measurement environment index is various indexes for the measurement environment that may have an influence on the moving tag detection, and includes a quantitative indexes and a qualitative indexes. The quantitative indexes of the measurement environment index are indexes having quantitative change among the measurement environment indexes. The quantitative indexes include, for example, speed, distance, number of moving tags, number of stop tags, stop tag position, number of reads, and the like. The speed is the moving speed of the moving tag.

The speed can be calculated from a speedometer or an accelerometer installed on the forklift 4, or can be calculated by image analysis by installing a camera. Further, the speed may be manually input to the evaluation device 20, or can be calculated by dividing the phase change amount by a reading time. The reading time means a period during which the information of the wireless tag 5 can be read.

The distance is the shortest distance between the tag reader 10 and the wireless tag 5. The distance can be calculated based on the maximum RSSI value. This is because there is a correlation between RSSI and the distance. Further, the distance may be calculated by providing a distance measuring sensor, or may be calculated by installing a camera and performing image analysis. Alternatively, the distance may be manually input.

The number of moving tags is the number of moving tags that can be read simultaneously. Simultaneous means one read process. The number of moving tags may be manually input to the evaluation device 20. It is also possible to obtain the IDs of the moving tags in advance, and set the number of IDs obtained simultaneously by communicating with the wireless tag 5 and matchings the IDs obtained in advance as the number of moving tags. Further, a camera may be installed and the number of moving tags may be calculated by image analysis.

The number of stop tags can be calculated, for example, by subtracting the number of moving tags from the number of wireless tags 5 that can communicate. Further, it is also possible to obtain the IDs of the stop tags in advance and set the number of IDs obtained by communication with the wireless tag 5 and matching the IDs obtained in advance as the number of stop tags. The number of stop tags can also be manually input to the evaluation device 20.

For the stop tag position, the distance from the tag reader 10 to the nearest stop tag may be manually input. The number of reading times is the number of times that the tag reader 10 can read information from the moving tag while the moving tag passes through the passage 2.

The qualitative indexes are indexes that do not change quantitatively among the measurement environment indexes. The qualitative indexes include, for example, the presence or absence of temporary stop, the presence or absence of meandering driving, tag box type, driver, and the like. The presence or absence of temporary stop can be determined from the ratio of the period during which the phase change amount of the moving tag is small enough to be regarded as stop to the reading time of the moving tag. Further, when a time during which the speed that can be calculated based on the accelerometer attached to the forklift 4 is 1 km/h is equal to or longer than a threshold time for determining a temporary strop, it can be considered that there is a temporary strop.

The presence or absence of meandering driving can be determined by monitoring with a camera whether the path of the forklift 4 deviates from a constant speed straight path. The tag ID and rules for grouping are predetermined, and the tag box type can be determined from the tag ID obtained by communication. The driver can be attached with a tag unique to the driver, and the driver can be determined by communication with the tag. The qualitative indexes may also be determined by image recognition. In addition, any qualitative indexes can be entered manually.

When the measurement environment index is classified, if the measurement environment index is a quantitative index, the quantitative index is divided into a plurality of numerical ranges, and the moving tag evaluation value is classified according to the numerical range of the quantitative index. If the measurement environment index is a qualitative index, the moving tag evaluation value is classified according to the presence or absence of the qualitative index.

Figures 9, 10:
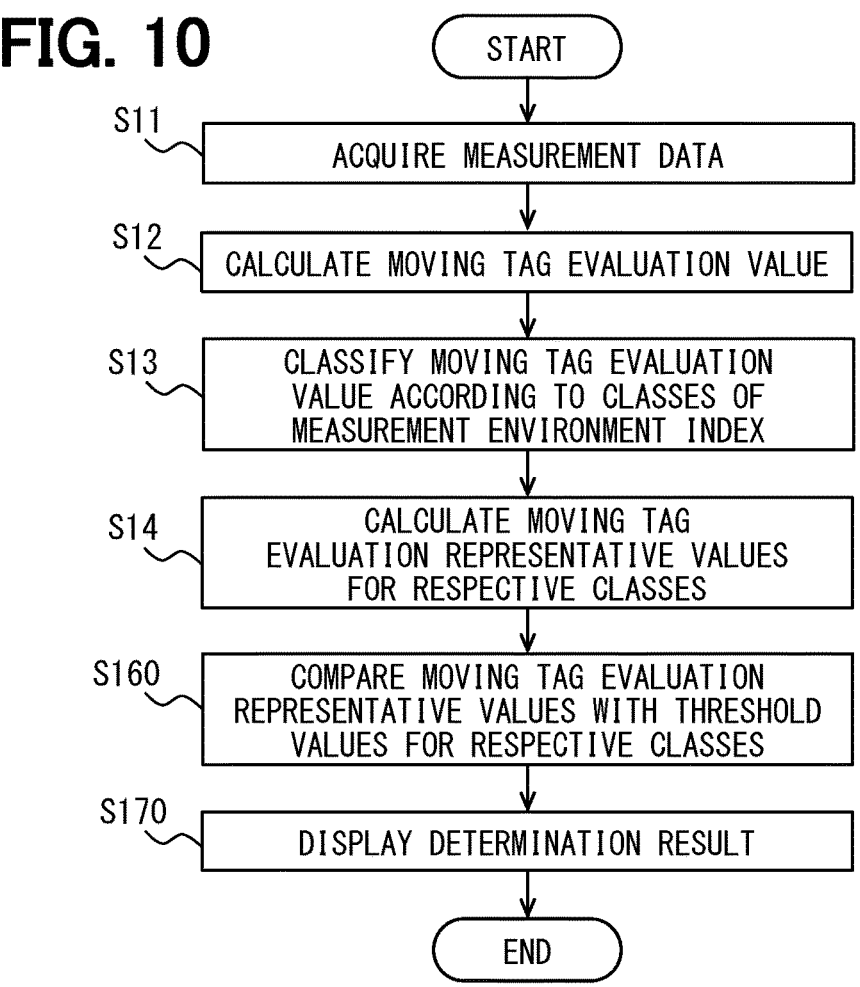
FIG. 9 is a diagram illustrating measurement environment indexes and classes.
FIG. 10 is a diagram showing a process executed by an evaluation device in a third embodiment.

FIG. 9 shows the classification when the measurement environment indexes are the maximum RSSI, the speed, and the number of moving tags. The maximum RSSI is an index meaning the shortest distance between the tag reader 10 and the wireless tag 5 described above. The maximum RSSI is classified into two classes having a numerical range of −50 dBm or more and −60 dBm or less. Therefore, the maximum RSSI of −60 dBm to −50 dBm is not classified into any class. There are numerical ranges in which speed and the number of moving tags are not classified into any class. In this way, there may be a numerical range that is not classified into any class. Since there is a numerical range that is not classified into any of the classes, it is possible to prevent the index values that are close to each other, such as the maximum RSSI of −49 dBm and −51 dBm, from being classified into different classes. This makes it easier to determine the effect of fluctuations in the measurement environment index on the moving tag detection.

In S14, which corresponds to the representative value determination section, the moving tag evaluation representative value is calculated for each class. FIG. 9 shows the average phase change amount as the moving tag evaluation representative value. The average phase change amount is an average value of the phase change amounts calculated for the plurality of wireless tags 5.

In S15, the difference between the moving tag evaluation representative values for respective classes is calculated. In the example of the maximum RSSI of FIG. 9, 3000-1000 is calculated. When the measurement environment index is divided into three or more classes, the difference between the maximum tag evaluation representative value and the minimum tag evaluation representative value is calculated. Alternatively, the difference may be calculated for all combinations of classes.

In S16, which corresponds to the environment evaluation section, the difference calculated in S15 is compared with the threshold value set in advance for the difference, and it is determined whether the classified measurement environment index has an influence on the moving tag detection. Specifically, when the difference is larger than the threshold value, it is determined that the classified measurement environment index has an influence on the moving tag detection. In S17, the determination result of S16 is displayed on the display unit 22. In the example of FIG. 9, the determination result that the maximum RSSI has an influence is displayed on the display unit 22. Further, the display unit 22 displays the determination result that there is no influence if the classified measurement environment index is the speed, and the display unit 22 displays the determination result that there is an influence if the classified measurement environment index is the number of moving tags.

According to the second embodiment, the moving tag evaluation representative values are calculated for the respective classes of the measurement environment index (S14), and the moving tag evaluation representative values for the respective classes are compared. Accordingly, it can be seen whether the classified measurement environment index has an influence on the moving tag detection.

Third Embodiment

FIG. 10 shows a process for determining the suitability of moving tag detection, which is executed by the evaluation device 20 in a third embodiment. For example, the process shown in FIG. 10 is executed by the CPU 21a in the arithmetic unit 21 by executing a program stored in the ROM 21b. The process shown in FIG. 10 is executed by the evaluation device 20 instead of the process shown in FIG. 8. The processes shown in FIG. 10 are the same as the processes in FIG. 8 up to S14. As described above, in S14, the moving tag evaluation representative value is calculated for each class of the measurement environment index.

In FIG. 10, S15 executed in FIG. 8, is not executed. Further, S160 is executed instead of S16. In S160, which corresponds to the environment evaluation section, the moving tag evaluation representative value is compared with the threshold value set in advance for the moving tag evaluation representative value for each class. As a result of comparison, if the moving tag evaluation representative value is on the side more suitable for the moving tag detection than the threshold value in all the classes, it is determined that the measurement environment is suitable for the moving tag detection and the measurement environment index has a little influence on the moving tag detection. As a result of comparison, if the moving tag evaluation representative value is on the side less suitable for the moving tag detection than the threshold value in any one class, it is determined that the measurement environment is not suitable for moving tag detection. The side more suitable for the moving tag detection than the threshold value is, for example, the side larger than the threshold value in the case of the average phase change amount, and the side smaller than the threshold value in the case of the representative value of the phase deviation. In S170, the determination result of S160 is displayed on the display unit 22.

In the second embodiment, it was only possible to determine whether the measurement environment index has an influence on the moving tag detection. However, in the third embodiment, it is possible to determine whether the measurement environment in which the measurement data is obtained is suitable for the moving tag detection by comparing the moving tag evaluation representative values calculated for the respective classes with the threshold values. In addition, since the moving tag evaluation representative values are calculated for the respective classes of the measurement environment index, it is possible to suppress the determination that the measurement environment is suitable for the moving tag detection even though the measurement environment of some classes for which the measurement data was obtained is not suitable for the moving tag detection.

Fourth Embodiment

Figure 11:
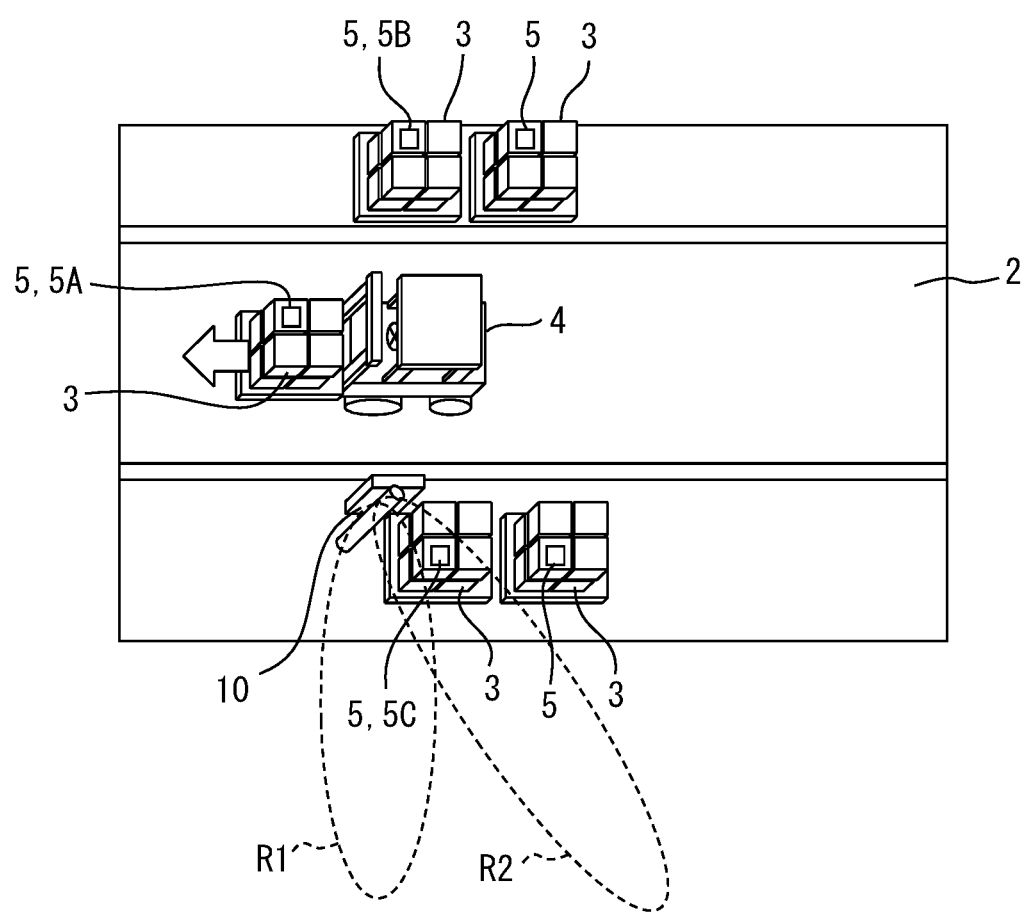
FIG. 11 is a diagram illustrating positions where stop tags are arranged.

Next, a fourth embodiment will be described. In the fourth and subsequent embodiments, a stop tag is also arranged in the measurement environment to evaluate whether the measurement environment is suitable for the moving tag detection. The stop tags may be arranged at various positions, but it is preferable to arrange them in regions R1 and R2 illustrated in FIG. 11. The region R1 is a region extending from the tag reader 10 in a direction perpendicular to the passage 2 and away from the tag reader 10. The region R2 is a region extending from the tag reader 10 in a direction away from the tag reader 10 and the passage 2 at an angle intersecting the passage 2 at an angle of about 45 degrees.

When the stop tag is arranged in the region R1, the number of times the stop tag is read increases, and the RSSI also increases. Further, when the stop tag is arranged in the region R2, the phase change amount and the phase deviation of the stop tag become close to the phase change amount and the phase deviation of the moving tag. If it can be determined that the measurement environment is suitable for the moving tag detection even if the measurement environment is evaluated in a state where the stop tags are arranged in such regions R1 and R2, it can be determined that the measurement environment is sufficiently suitable for the moving tag detection.

Figure 12:
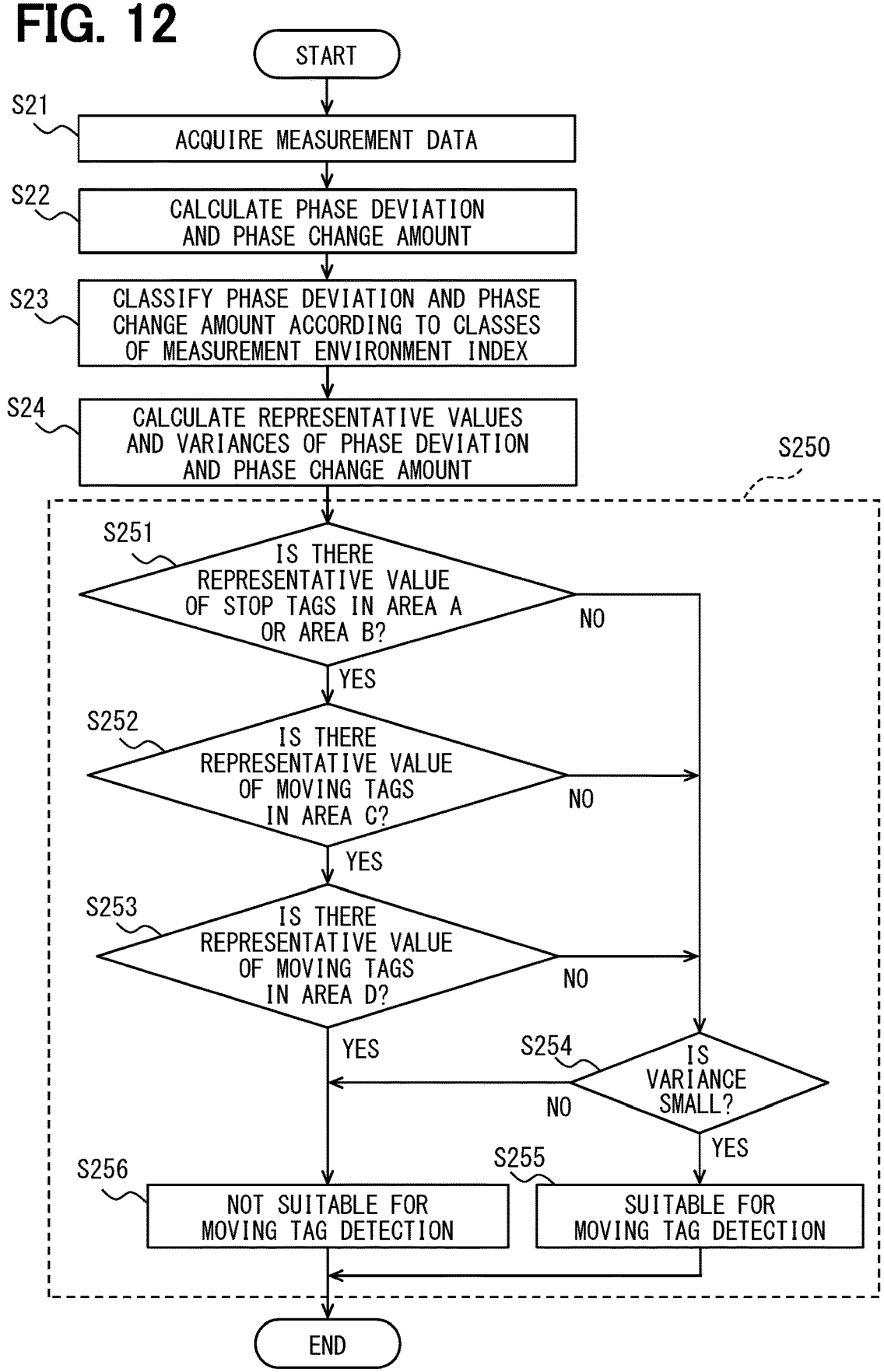
FIG. 12 is a diagram showing a process executed by an evaluation device in a fourth embodiment.

FIG. 12 shows a process for determining the suitability of moving tag detection, which is executed by the evaluation device 20 in the fourth embodiment. For example, the process shown in FIG. 12 is executed by the CPU 21a in the arithmetic unit 21 by executing a program stored in the ROM 21b. In the process shown in FIG. 12, S21 is the same as S11 in FIG. 9, and the measurement data is acquired from the tag reader 10.

In S22, which corresponds to the evaluation value determination section, the phase deviation and the phase change amount are calculated for each wireless tag 5 based on the measurement data acquired in S21. In the fourth embodiment, the wireless tag 5 includes moving tags and stop tags. Therefore, in S22, the phase deviation and the phase change amount, that is, the moving tag evaluation values for the moving tag, and the phase deviation and the phase change amount, that is, the moving tag evaluation values for the stop tag are calculated.

In S23, the phase deviation and the phase change amount calculated in S22 are classified according to the classes of the measurement environment index. In S24, which corresponds to the representative value determination section, the representative value and variance of the phase deviation and the representative value and variance of the phase change amount are calculated for each class with separating the moving tag and the stop tag. Instead of the variance, the standard deviation may be calculated.

Figure 13:
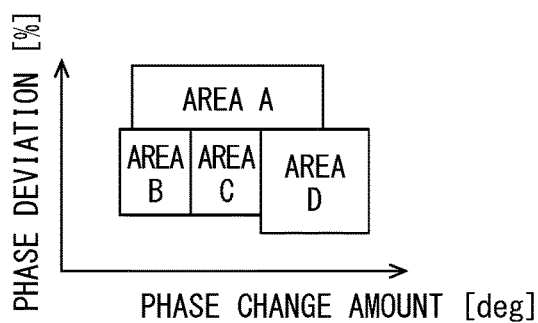
FIG. 13 is a diagram illustrating areas used in the processes in FIG. 12.

S251 and subsequent processes, that is, S250 is a process to be executed for each class. S250 is a process as the environment evaluation section. In S251, it is determined whether there is a point determined by the representative value of the phase deviation and the representative value of the phase change amount of the stop tag in an area A or an area B shown in FIG. 13. The area A and the area B are boundary areas between the phase deviation and the phase change amount of the stop tag and the phase deviation and the phase change amount of the moving tag. It has been clarified by experiments that the point determined by the phase deviation and the phase change amount of the stop tag is not located in a lower right part of FIG. 13. The specific numerical values of the area A and the area B are determined by repeating the experiment.

If there is no point determined by the representative value of the phase deviation of and the representative value of the phase change amount of the stop tag in the area A or the area B (S251 is NO), it can be said that a point determined by the representative value of the phase deviation and the representative value of the phase change amount of the stop tag is located on the left of or above the area A and area B.

If the determination result of S251 is NO, the process proceeds to S254. In S254, it is determined whether the variance of the population for which the representative value is calculated is small. The reason for determining whether the variance is small is that when the variance is large, that measurement environment is determined to be not suitable for the moving tag detection because the measurement variation is large. A threshold value for determining that the variance is small may be appropriately set. Further, when the determination result of S251 becomes NO and the process proceeds to S254, it also means that it is determined whether it can be said that the phase deviations and the phase change amounts of most of the stop tags are on the left of or above the area A and the area B.

If the determination result of S254 is YES, the moving tags and the stop tags can be distinguished. Therefore, the process proceeds to S255, and it is determined that the measurement environment is suitable for the moving tag detection, and the determination result is displayed on the display unit 22.

If the determination result of S261 is YES, the process proceeds to S252. In S252, it is determined whether there is a point determined by the representative value of the phase deviation and the representative value of the phase change amount of the moving tag in an area C. The area C is also a boundary area between the phase deviation and the phase change amount of the stop tag and the phase deviation and the phase change amount of the moving tag. It has been clarified by experiments that the point determined by the phase deviation and the phase change amount of the stop tag is not located on the left of or above the area C in FIG. 13. The specific numerical value of the area C is determined by repeating the experiment.

When there is the representative value of the moving tag is in the area C, it is difficult to distinguish between the moving tag and the stop tag. If the representative value of the moving tag is in the area C, the determination result of S252 is YES. If the determination result of S252 is NO, it can be determined that most of the points determined by the phase change amount and the phase deviation of the moving tag are on the right of or below the area C of FIG. 13. If the determination result of S252 is NO, the process proceeds to S254, and if the variance is small, it is determined that the measurement environment is suitable for the moving tag detection.

If the determination result of S252 is YES, the process proceeds to S253. In S253, it is determined whether there is a point determined by the representative value of the phase deviation and the representative value of the phase change amount of the moving tag in an area D. The area D is an quasi-boundary area adjacent to the area C on a side where the moving tag evaluation value of the moving tag is more likely to be present than the area C. If a point determined by the phase change amount and phase deviation of the moving tag is not present in neither the area C nor the area D, it can be determined that the phase change amount and phase deviation of the moving tag are on the right of or below the area D.

If the determination result of S253 is NO, the process proceeds to S254, and if the variance is small, it is determined that the measurement environment is suitable for the moving tag detection.

If the determination result of S253 is YES, the process proceeds to S256, it is determined that the measurement environment is not suitable for the moving tag detection, and the determination result is displayed on the display unit 22.

In the fourth embodiment, whether the measurement environment is suitable for the moving tag detection is determined by two types of moving tag evaluation representative values. Therefore, it is possible to make a more accurate determination than determining whether the measurement environment is suitable for the moving tag detection by one type of moving tag evaluation representative value. The moving tag evaluation value same as that determined to be suitable for the moving tag detection is also used for actual moving tag detection. Further, in the fourth embodiment, it is possible to determine whether the measurement environment is suitable for the moving tag detection for each class of the measurement environment index.

When points of moving tags and stop tags are plotted as shown in FIG. 4, it is difficult to distinguish the moving tags and the stop tags only by the phase change amount. Moreover, it is difficult to distinguish between the moving tags and the stop tags only by the phase deviation. However, even when the points of the moving tags and the stop tags are plotted as in the example of FIG. 4, the phase change amount and the phase deviation are used as two types of moving tag evaluation values as in the fourth embodiment, the moving tags and the stop tags can be distinguished.

Fifth Embodiment

Figure 14:
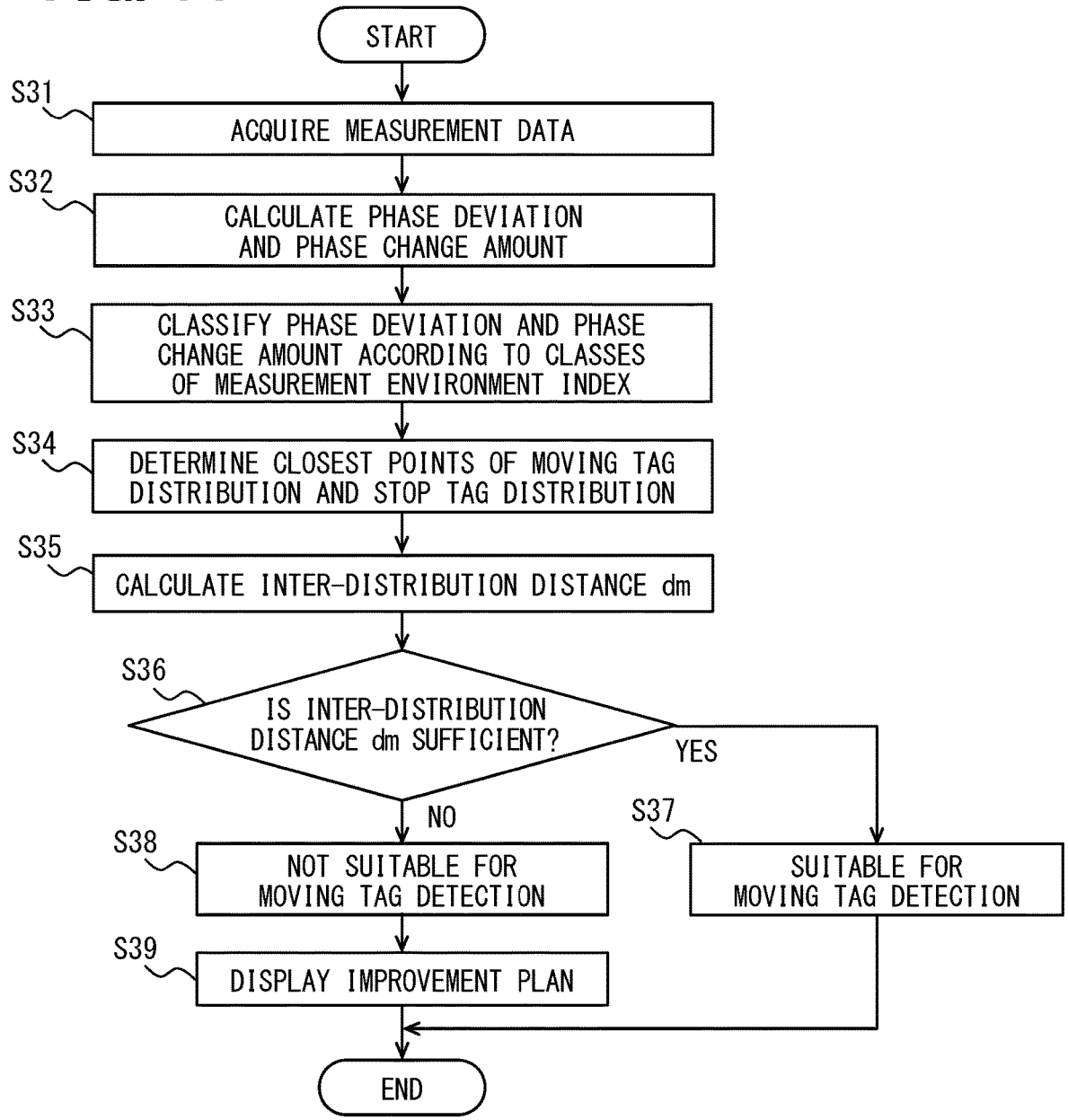
FIG. 14 is a diagram showing a process executed by an evaluation device in a fifth embodiment.

FIG. 14 shows a process for determining the suitability of moving tag detection, which is executed by the evaluation device 20 in a fifth embodiment. For example, the process shown in FIG. 14 is executed by the CPU 21a in the arithmetic unit 21 by executing a program stored in the ROM 21b. In FIGS. 14, S31 to S33 are the same as S21 to S23 in FIG. 12. Therefore, S32 corresponds to the evaluation value determination section.

S34 and the subsequent processes are processes to be executed for each class. In S34, which corresponds to a feature value determination section, closest points of the points of the moving tags and the points of the stop tags are determined. The closest points are a moving tag evaluation feature value showing the feature of the distribution of the moving tag evaluation values for the moving tags and a moving tag evaluation feature value showing the feature of the distribution of the moving tag evaluation values for the stop tags.

The moving tag evaluation feature value is a value indicating the feature of the moving tag evaluation values in the stop tag distribution or the moving tag distribution. The moving tag evaluation feature value is, for example, a representative value, that is, an average value, a median value, a mode value, or the like of the moving tag evaluation values in the stop tag distribution or the moving tag distribution.

Further, the moving tag evaluation feature value may be an end value. The end value is a value representing the end of the distribution, and is a value representing the end on the side close to the boundary that separates the moving tags and the stop tags. The end value is, for example, the maximum value or the minimum value. Further, the end value may be a representative value of the upper layer such as the upper 10% instead of the maximum value, and may be a representative value of the lower layer such as the lower 10% instead of the minimum value.

Figure 15:
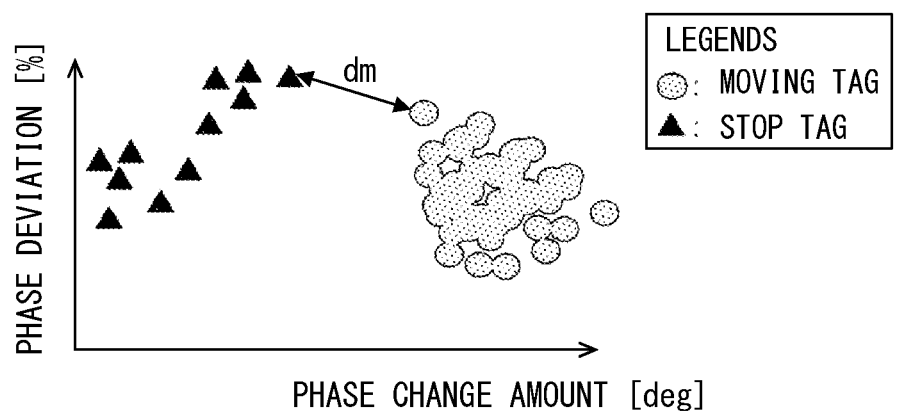
FIG. 15 is a diagram illustrating an inter-distribution distance dm.

In S35, which corresponds to an inter-distribution distance calculation section, an inter-distribution distance dm indicating the degree of dissociation between the two moving tag evaluation feature values is calculated. The inter-distribution distance dm will be described with reference to FIG. 15. The inter-distribution distance dm is the distance between the distribution of the moving tag evaluation values of the moving tags and the distribution of the moving tag evaluation values of the stop tags. In particular, in the present embodiment, it is the closest distance between the points of the moving tags and the points of the stop tag when the evaluation values of the two moving tag evaluation values are plotted on a two-dimensional graph. In other words, in the two-dimensional graph shown in FIG. 15, the minimum distance between the points of the moving tags and the points of the stop tags is the inter-distribution distance dm.

In S36, which corresponds to the environmental evaluation section, it is determined whether the inter-distribution distance dm is sufficient. Sufficient here means that it is sufficient to distinguish between the stop tags and the moving tags, and if the inter-distribution distance dm calculated in S34 is larger than a threshold value set from this viewpoint, the inter-distribution distance dm is determined to be sufficient. If the determination result of S36 is YES, the process proceeds to S37. In S37, it is determined that the measurement environment is suitable for the moving tag detection, and the determination result is displayed on the display unit 22.

If the determination result of S36 is NO, the process proceeds to S38. In S38, it is determined that the measurement environment is not suitable for the moving tag detection. In the following S39, an effective improvement plan is searched for, and the searched improvement plan is displayed on the display unit 22 together with the determination result of S38.

Figure 16:
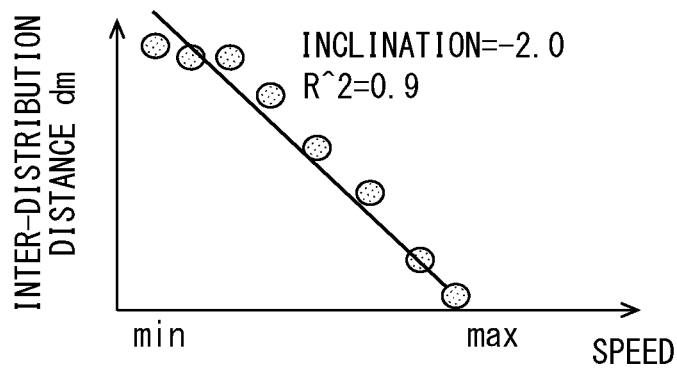
FIG. 16 is a diagram illustrating a relationship between a speed and the inter-distribution distance dm.
Figure 17:
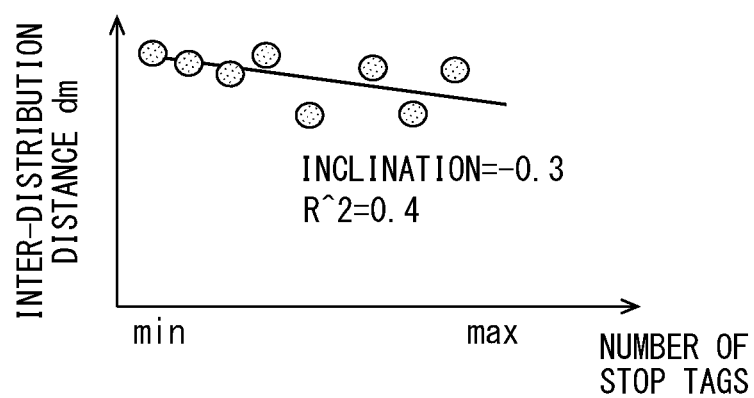
FIG. 17 is a diagram illustrating a relationship between the number of stop tags and the inter-distribution distance dm.

The improvement plan proposes the improvement of the measurement environment index that can effectively increase the inter-distribution distance dm. The relationships of the inter-distribution distances dm of the plurality of moving tag evaluation values with respect to the change in the measurement environment indexes are measured in advance. FIG. 16 and FIG. 17 illustrate these relationships.

In FIG. 16, the measurement environment index is the speed. The inter-distribution distance dm on the vertical axis is the inter-distribution distance dm in the graph in which the two moving tag evaluation values of the phase change amount and the phase deviation are plotted as in FIG. 15. In FIG. 17, the measurement environment index is the number of stop tags. The inter-distribution distance dm on the vertical axis is the same as in FIG. 16. From the relationship shown in FIG. 16, it can be seen that the inter-distribution distance dm increases as the speed decreases. On the other hand, from the relationship shown in FIG. 17, it can be seen that the inter-distribution distance dm does not increase so much even if the number of stop tags is reduced.

The improvement plan to be searched for is a plan to change the current measurement environment index that has room for improvement in the direction of increasing the inter-distribution distance dm. In addition, when there is a plurality of measurement environment indexes that have room for improvement, the plans changing the measurement environment indexes in the direction of increasing the inter-distribution distance dm are proposed in order from the one with the largest change in the inter-distribution distance dm with respect to the change in the measurement environment index.

In the fifth embodiment, it is determined whether the moving tags and the stop tags can be distinguished by the distance of the closest points of the points of the stop tags and the points of the moving tags when the two moving tag evaluation values, that is, the points determined by the amount of phase change and the phase deviation are plotted on the graph. Also by the above method, it is possible to accurately determine whether the moving tags and the stop tags can be distinguished.

Further, in the fifth embodiment, when it is determined that the measurement environment is not suitable for the moving tag detection, an improvement plan is searched for and presented (S39). Therefore, the user can know how to create a measurement environment suitable for the moving tag detection.

Sixth Embodiment

Figures 18, 19:
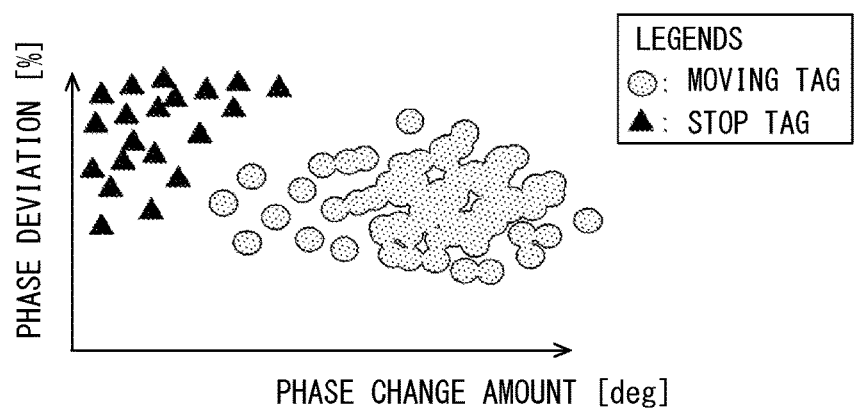
FIG. 18 is a diagram showing results of measuring phase change amounts and phase deviations three times at different speeds.
FIG. 19 is a diagram in which phase change amounts and phase deviations of moving tags and stop tags are plotted on a two-dimensional graph.

Next, a sixth embodiment will be described. FIG. 18 shows a part of results of calculating the phase change amount and the phase deviation, which are the moving tag evaluation values, for each tag with changing the speed, which is a measurement environment index, into three types in order to evaluate whether the speed is suitable for the moving tag detection.

FIG. 19 shows a diagram in which the phase change amounts and the phase deviations of the moving tags and the stop tags are plotted in two-dimensional coordinates based on the data obtained in first and second trials. From FIG. 19, it can be seen that the range in which the phase change amounts of the moving tags are distributed and the range in which the phase change amounts of the stop tags are distributed partially overlap. If the range in which the phase change amounts of the moving tags are distributed overlaps with the range in which the phase change amounts of the stop tags are distributed, there is a possibility that a stop tag is erroneously determined as a moving tag, or conversely, a moving tag is erroneously determined as a stop tag. Therefore, it can be said that the measurement environment is not suitable for the moving tag detection.

Figure 20:
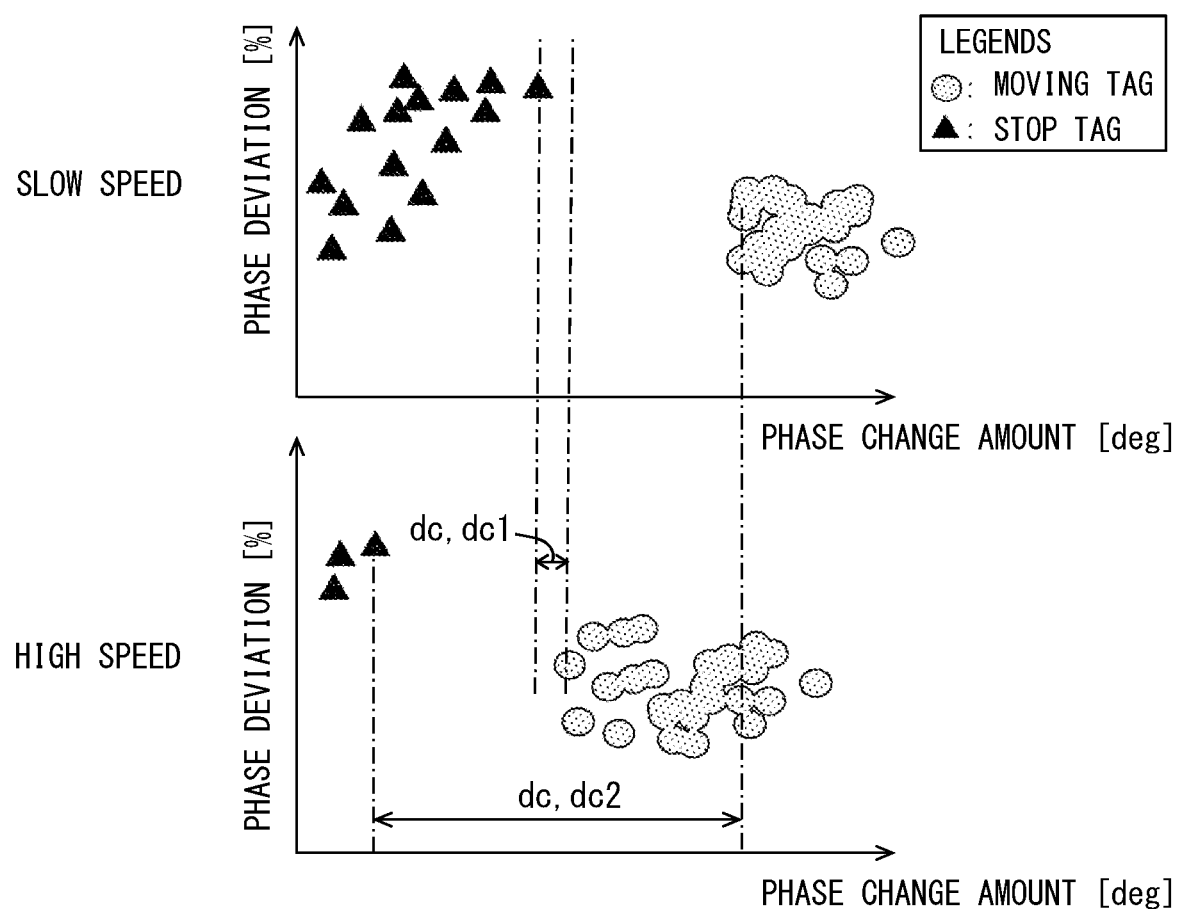
FIG. 20 is diagram in which the phase change amounts and the phase deviations of the moving tag and the stop tag are plotted on a two-dimensional graph with dividing the speed.

However, in each of an upper diagram and a lower diagram in FIG. 20, it can be seen that the moving tags and the stop tags can be distinguished. The upper diagram in FIG. 20 shows data of the first trial in which the speed is set to be relatively slow. The lower diagram in FIG. 20 shows data of the second trial in which the speed is set to be relatively high.

Figure 21:
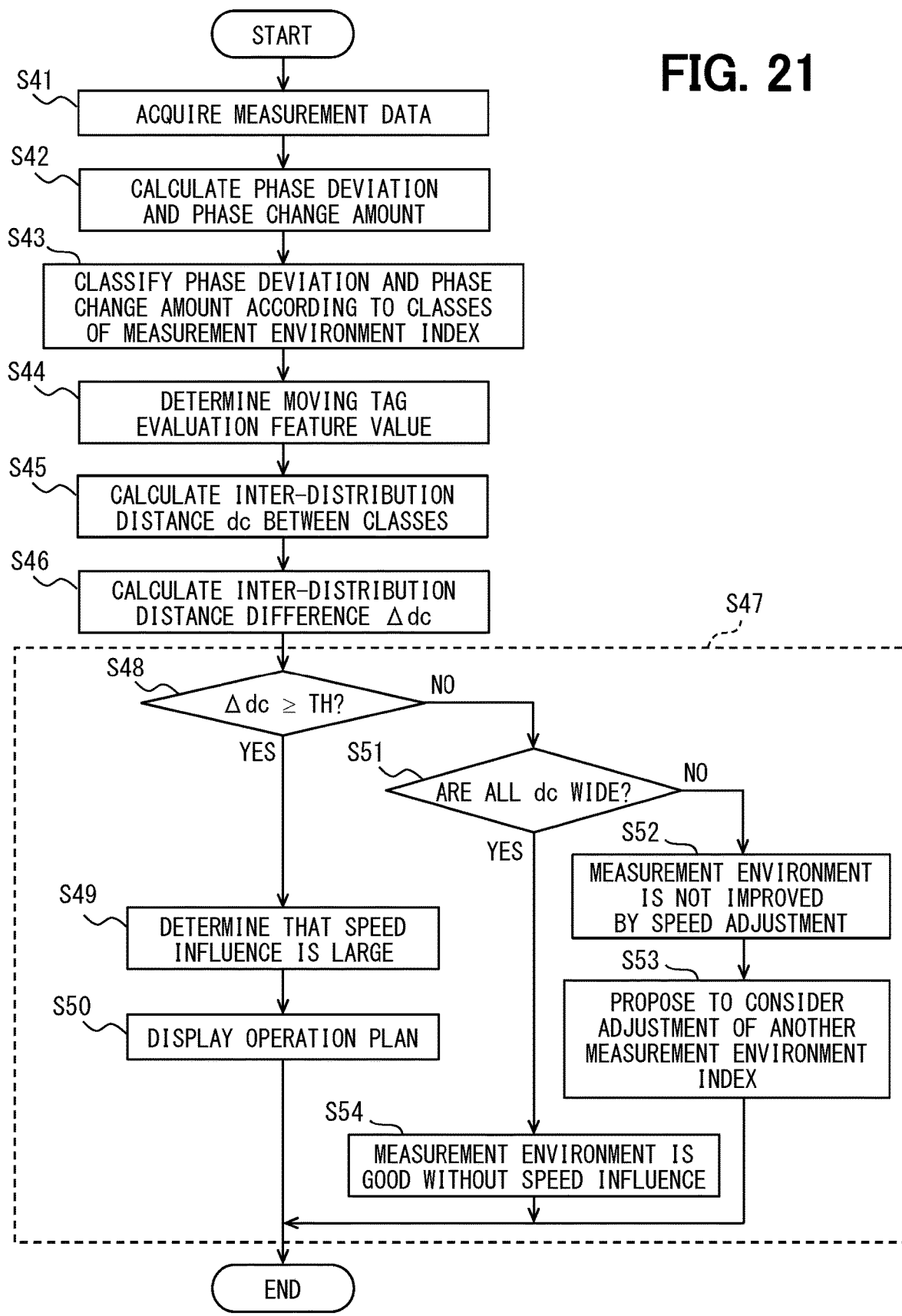
FIG. 21 is a diagram showing a process executed by an evaluation device in a sixth embodiment.

In the sixth embodiment, the evaluation device 20 execute a process shown in FIG. 21. For example, the process shown in FIG. 21 is executed by the CPU 21*a* in the arithmetic unit 21 by executing a program stored in the ROM 21*b*. S41 to S43 are the same as S21 to S23 in FIG. 12. Therefore, S42 corresponds to the evaluation value determination section. In S44, which corresponds to the feature value determination section, the moving tag evaluation feature value of the moving tag distribution and the moving tag evaluation feature value of the stop tag distribution are determined for each class.

In S45, which corresponds to the inter-distribution distance calculation section, an inter-distribution distance dc between classes is calculated. The inter-distribution distance dc between the classes is the difference between the moving tag evaluation feature value of the stop tag distribution in one class and the moving tag evaluation feature value of the moving tag distribution in another class.

FIG. 20 shows the inter-distribution distance dc between the two classes. One inter-distribution distance dc1 is the difference between the maximum value of the phase change amounts of the stop tags measured at the slow speed and the minimum value of the phase change amounts of the moving tags measured at the high speed. The other inter-distribution distance dc2 is the difference between the maximum value of the phase change amounts of the stop tags measured at the high speed and the minimum value of the phase change amounts of the moving tags measured at the low speed. In FIG. 20, the inter-distribution distance dc is calculated only from the phase change amount, but as in the inter-distribution distance dm of the fifth embodiment, the inter-distribution distance dc may be the minimum distance between points indicated by the plurality of types of moving tag evaluation values.

In S46, an inter-distribution distance difference $\Delta$dc is calculated. The inter-distribution distance difference $\Delta$dc is the difference between the plurality of inter-distribution distances dc calculated in S44. In the example of FIG. 20, dc2-dc1 is the inter-distribution distance difference $\Delta$dc.

S47 corresponds to the environment evaluation section. Specifically, S47 includes processes of S48 to S54. In S48, it is determined whether the inter-distribution distance difference $\Delta$dc calculated in S46 is equal to or greater than a threshold value TH. If the determination result of S48 is YES, the process proceeds to S49. If the determination result of S48 is YES, the difference between the inter-distribution distances dc1 and dc2 is equal to or larger than the threshold value TH. Therefore, in S49, it is determined that the influence of the classified measurement environment index is large, that is, the speed influence is large in the example of FIG. 20.

In the following S50, the determination result of S49, that is, the fact that the speed influence is large, and an operation plan are displayed on the display unit 22. The operation plan is set in advance for each class of measurement environment index. If the measurement environment index that is classified is the speed, the operation plan is an operation plan for reducing a speed fluctuation. As a concrete operation plan for reducing the speed influence, there is a plan such as lowering the maximum speed and increasing the minimum speed. In addition, since the speed influence is large, there may be a plan to detect the speed and group the speed by speed bands.

If the determination result in S48 is NO, the process proceeds to S51. When the determination result of S48 is NO, the magnitudes of the inter-distribution distances dc1 and dc2 are similar to each other. Therefore, in S51, it is determined whether all the inter-distribution distance dc are wide. If the determination result of S51 is NO, the process proceeds to S52.

If the process proceeds to S52, the moving tags and the stop tags cannot be distinguished even by classifying according to the speed. Therefore, in S52, it is determined that the measurement environment is not improved by the speed adjustment. In the following S53, the determination result of S52 and a message proposing to consider the adjustment of another measurement environment index are displayed on the display unit 22.

If the determination result of S51 is YES, the process proceeds to S54. When the process proceed to S54, all the inter-distribution distances dc are wide. Therefore, in S54, it is determined that the measurement environment is good without being influenced by the speed, and the determination result is displayed on the display unit 22.

In the sixth embodiment, the phase change amount and the phase deviation are classified according to the speed, which is one of the measurement environment indexes (S43). Then, by determining whether the inter-distribution distance dc between the classes is equal to or greater than the threshold value TH, it is possible to determine the influence of the fluctuation of the speed, which is one of the measurement environment indexes, on the suitability of the moving tag detection (S48). Therefore, when it is determined that the speed influence is large (S49), an operation plan for an appropriate operation can be displayed (S50).

Further, since the influence of the fluctuation of the speed, which is one of the measurement environment indexes, on the suitability of the moving tag detection is determined (S48), it can also be determined that the measurement environment is not improved by the speed adjustment (S52), and there is no speed influence (S54).

Seventh Embodiment

A seventh embodiment is a modification of the sixth embodiment. In the sixth embodiment, as shown in FIG. 18, the speed is changed for every number of trials. In the seventh embodiment, when a certain number of trials is selected by the user operation, a graph showing only the phase change amounts and the phase deviations of the selected number of trials are displayed on the display unit 22.

Figure 22:
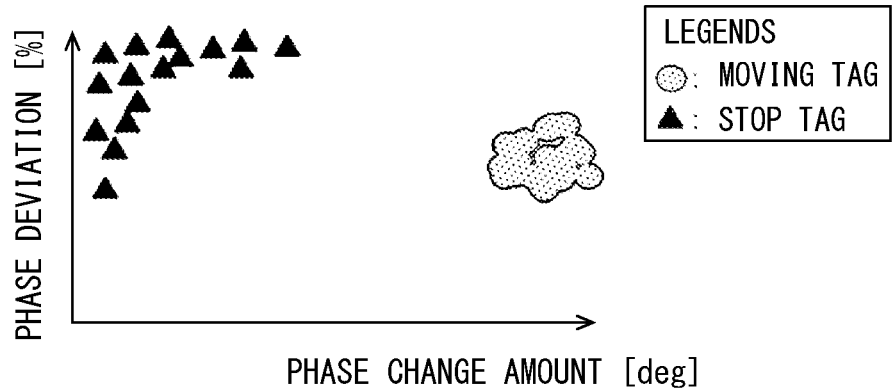
FIG. 22 is a graph showing only data of a first trial.
Figure 23:
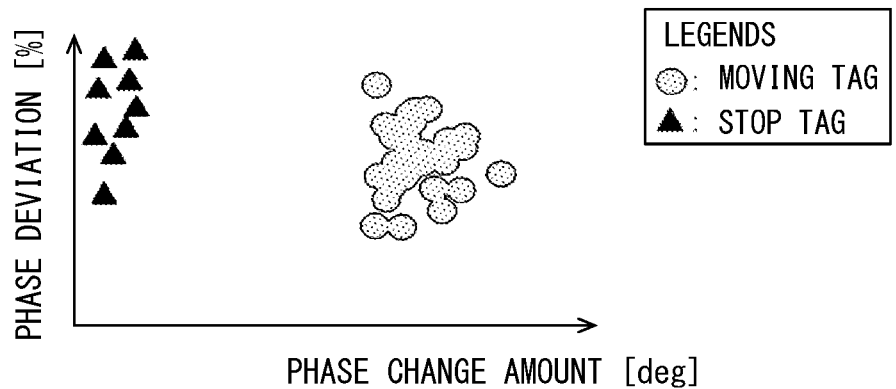
FIG. 23 is a graph showing only data of a second trial.
Figure 24:
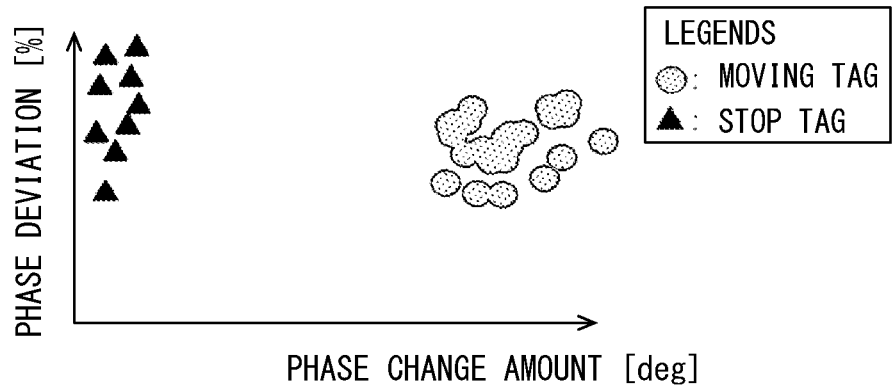
FIG. 24 is a graph showing only data of a third trial.

FIG. 22 is an example of a graph displayed when the first trial number is selected by the user operation. FIG. 23 is an example of a graph displayed when the second trial number is selected by the user operation. FIG. 24 is an example of a graph displayed when the number of third trials is selected by the user operation.

In this way, when only the phase change amounts and the phase deviations of the selected number of trials are displayed as a graph as shown in FIGS. 22 to 24, the user can look at the display and check whether there is a speed influence.

Further, in addition to the graphs shown in FIGS. 22 to 24, as shown in FIG. 25, the display unit 22 may show differences between the data of the selected number of trials and the data of the other numbers of trials. The example shown in FIG. 25 is an example when the first trial data is selected. In the example shown in FIG. 25, the difference between the data of the selected number of trials and the data of the other numbers of trials, the reason why the difference occurs, and the solution example are displayed.

Eighth Embodiment

An eighth embodiment is a modification of the fifth embodiment. In the eighth embodiment, as shown in FIG. 26, it is determined that the measurement environment is suitable for moving tag detection in S37, the determination result is displayed on the display unit 22, and then S40 is executed.

Figure 27:
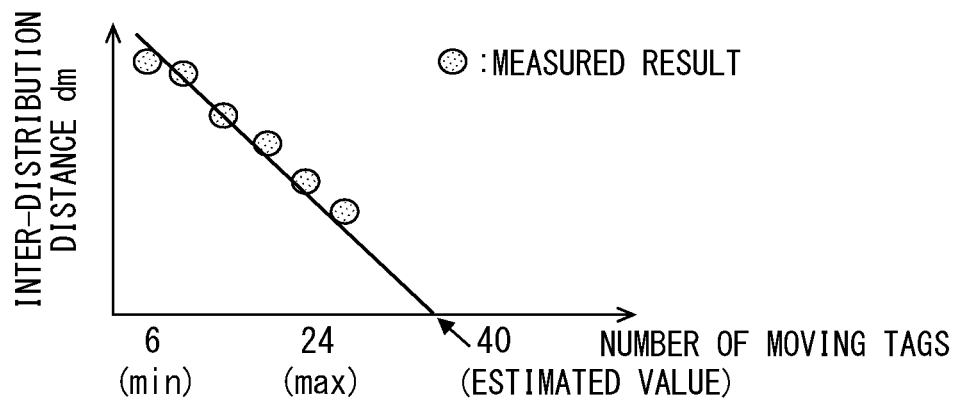
FIG. 27 is a diagram illustrating a relationship between the number of moving tags and the inter-distribution distance.

In S40, the range of the measurement environment index suitable for the moving tag detection is determined and displayed. FIG. 27 shows the inter-distribution distance dm when the measurement environment index is the number of moving tags. Unlike the graph shown in FIG. 16, the graph shown in FIG. 27 determines the minimum value of the inter-distribution distance dm by extrapolation. According to the graph of FIG. 27, when the number of moving tags is 40, the inter-distribution distance dm becomes 0. The minimum value of the inter-distribution distance dm suitable for moving tag detection is determined in advance by experiments. As an example displayed on the display unit 22 in S40, in the graph of FIG. 27, the number of moving tags that is the minimum value of the inter-distribution distance dm suitable for detecting moving tags may be displayed.

Figure 28:
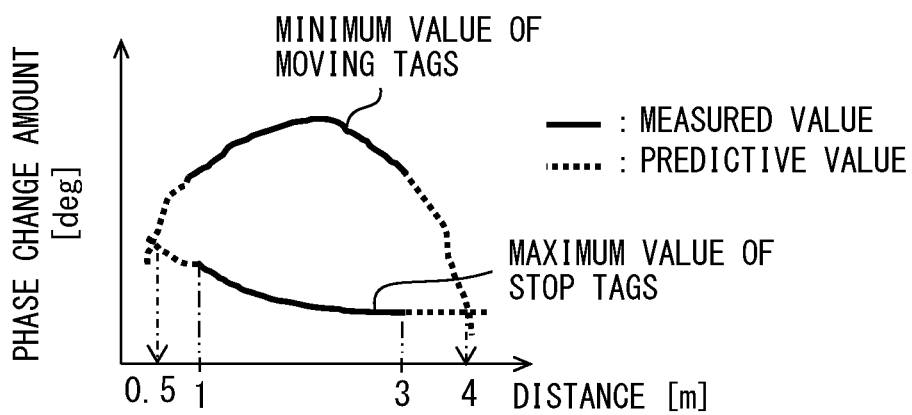
FIG. 28 is a diagram illustrating a relationship between a distance and a phase change amount.
Figure 29:
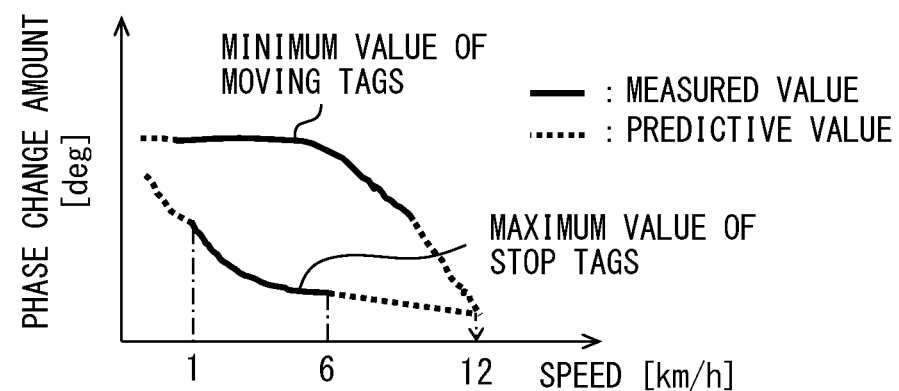
FIG. 29 is a diagram illustrating a relationship between a speed and a phase change amount.

FIG. 28 and FIG. 29 show examples different from the example shown in FIG. 27. In FIG. 28, the horizontal axis is the distance, that is, the shortest distance between the tag reader 10 and the wireless tag 5. The vertical axis is the phase change amount. In FIG. 29, the horizontal axis is the speed and the vertical axis is the phase change amount. In both FIGS. 28 and 29, a part of the curve showing the change in the minimum value of the moving tags and the curve showing the change in the maximum value of the stop tags are obtained by extrapolation.

In FIG. 27, the vertical axis is the minimum distance between the points of the moving tags and the points of the stop tags on the two-dimensional graph determined from the evaluation values of the two moving tag evaluation values. However, using only one moving tag evaluation value, the difference between the minimum value among the moving tag evaluation values of plurality of moving tags and the maximum value among the moving tag evaluation values of the plurality of stop tags can also be set as the inter-distribution distance dm.

In the example of FIG. 28, the difference between the minimum value of the moving tags and the minimum value of the stop tags at each distance on the horizontal axis is the inter-distribution distance dm. If the inter-distribution distance dm is 0, the moving tags and the stop tags cannot be distinguished. Therefore, the range of the distance at which the inter-distribution distance dm is equal to or greater than the threshold value set to a value larger than 0 is the range of the distance suitable for the moving tag detection.

FIG. 29 is different from FIG. 28 in that the horizontal axis is the speed. In the example of FIG. 29, the difference between the minimum value of the moving tags and the minimum value of the stop tags at each speed is the inter-distribution distance dm. The range of the speed at which the inter-distribution distance dm is equal to or greater than a threshold value set to a value larger than 0 is the range of the speed suitable for the moving tag detection.

Although the embodiments of the present disclosure have been described above, the present disclosure is not limited to the above embodiments, and various modified examples described below are also included in the technical scope of the present disclosure. Furthermore, various modifications other than the following can be made without departing from the gist.

(First Modification)

In the third embodiment, the moving tag evaluation representative value is compared with the threshold value set in advance for the moving tag evaluation representative value for each class (S160). However, in S160, instead of the moving tag evaluation representative value, the minimum value of the moving tag evaluation value may be compared with a threshold value set for comparing with the minimum value of the moving tag evaluation value.

(Second Modification)

In the sixth embodiment, the maximum value of the phase change amounts of the stop tags measured by slowing the speed, which is the end value, and the minimum value of the phase change amounts of the moving tags measured by increasing the speed, which is also the end value, are set as the moving tag evaluation feature value. However, other end values shown in the sixth embodiment may also be used as the moving tag evaluation feature value. Further, also in the sixth embodiment, the representative value may be used as the moving tag evaluation feature value. In the sixth embodiment, when the representative value is used as the moving tag evaluation feature value, a threshold value TH larger than when the end value is used as the moving tag evaluation feature value is used. Further, when the representative value is used as the moving tag evaluation feature value, it may be further determined whether the variance is small. The reason for determining whether the variance is small is the same as in the fourth embodiment. Similarly, in the fifth embodiment, end values other than the maximum value and the minimum value or representative values can be used.

(Third Modification)

The suitability of the measurement environment based on the tag detection index is determined only in the first embodiment. However, even in the second and subsequent embodiments, the suitability of the measurement environment may be determined based on the tag detection index.

What is claimed is:

1. A tag measurement environment evaluation device comprising:
   a processor; and
   a memory storing a program, the program configured to, when executed by the processor, cause the processor to:
   determine a moving tag evaluation value of each of a plurality of wireless tags based on a radio wave transmitted from each of the wireless tags and received by a tag reader configured to communicate with each of the wireless tags, the wireless tags including one or more moving tags that move and one or more stop tags that stop, the moving tag evaluation value being a value indicating how much each of the wireless tags is likely to be the moving tag;
   determine a moving tag evaluation representative value that is a representative value of the moving tag evaluation values of the wireless tags;
   determine, based on the moving tag evaluation representative value, whether a measurement environment is suitable for a moving tag detection in which the moving tags are detected while being distinguished from the stop tags;
   classify the moving tag evaluation values according to a plurality of classes of a measurement environment index that is an index of the measurement environment having a possibility of having an influence on the moving tag detection;
   determine the moving tag evaluation representative values for the respective classes of the measurement environment index; and
   determine whether the measurement environment index has the influence on the moving tag detection by comparing the moving tag evaluation representative values with each other.

2. A tag measurement environment evaluation device comprising:
   a processor; and
   a memory storing a program, the program configured to, when executed by the processor, cause the processor to:
   determine a moving tag evaluation value of each of a plurality of wireless tags based on a radio wave transmitted from each of the wireless tags and received by a tag reader configured to communicate with each of the wireless tags, the wireless tags including one or more moving tags that move and one or more stop tags that stop, the moving tag evaluation value being a value indicating how much each of the wireless tags is likely to be the moving tag;
   determine a moving tag evaluation representative value that is a representative value of the moving tag evaluation values of the wireless tags;
   determine, based on the moving tag evaluation representative value, whether a measurement environment is suitable for a moving tag detection in which the moving tags are detected while being distinguished from the stop tags;
   classify the moving tag evaluation values according to a plurality of classes of a measurement environment index that is an index of the measurement environment having a possibility of having an influence on the moving tag detection;
   determine the moving tag evaluation representative values for the respective classes of the measurement environment index; and
   compare the moving tag evaluation representative values with predetermined threshold values, respectively, and determine that the measurement environment is suitable for the moving tag detection in response to that the moving tag evaluation representative values for all of the classes are on a side more suitable for detecting the moving tag detection than the threshold values.

3. A tag measurement environment evaluation device comprising:
   a processor; and
   a memory storing a program, the program configured to, when executed by the processor, cause the processor to:
   determine a moving tag evaluation value of each of a plurality of wireless tags based on a radio wave transmitted from each of the wireless tags and received by a tag reader configured to communicate with each of the wireless tags, the wireless tags including one or more moving tags that move and one or more stop tags that stop, the moving tag evaluation value being a value indicating how much each of the wireless tags is likely to be the moving tag;
   determine a moving tag evaluation representative value that is a representative value of the moving tag evaluation values of the wireless tags;
   determine, based on the moving tag evaluation representative value, whether a measurement environment is suitable for a moving tag detection in which the moving tags are detected while being distinguished from the stop tags;
   classify the moving tag evaluation values according to a plurality of classes of a measurement environment index with distinguishing the moving tag evaluation values of the moving tags and the moving tag evaluation values of the stop tags, the measurement environment index being an index of the measurement environment that has a possibility of having an influence on the moving tag detection;
   determine the moving tag evaluation representative values of the moving tags for the respective classes of the measurement environment index and determine the moving tag evaluation representative values of the stop tags for the respective classes of the measurement environment index;
   determine whether the measurement environment is suitable for the moving tag detection for the respective classes;
   determine that the measurement environment is suitable for the moving tag detection in response to that the moving tag evaluation representative values of the stop tags are not in a boundary area between the moving tag evaluation representative values of the stop tags and the moving tag evaluation representative values of the moving tags, and a variance of the moving tag evaluation representative values of the moving tags and a variance of the moving tag evaluation representative values of the stop tags are both small; and
   determine that the measurement environment is suitable for the moving tag detection in response to that the moving tag evaluation representative values of the moving tags are present in the boundary area or a quasi-boundary area that is adjacent to the boundary area on a side where the moving tag evaluation values are more likely to be present than the boundary area, and the variance of the moving tag evaluation representative values of the moving tags and the variance of the moving tag evaluation representative values of the stop tags are both small.

4. A tag measurement environment evaluation device comprising:
a processor; and
a memory storing a program, the program configured to, when executed by the processor, cause the processor to:
determine a moving tag evaluation value of each of a plurality of wireless tags based on a radio wave transmitted from each of the wireless tags and received by a tag reader configured to communicate with each of the wireless tags, the wireless tags including one or more moving tags that move and one or more stop tags that stop, the moving tag evaluation value being a value indicating how much each of the wireless tags is likely to be the moving tag;
determine a feature of a distribution of the moving tag evaluation values of the moving tags as a moving tag evaluation feature value of the moving tags, and determine a feature of a distribution of the moving tag evaluation values of the stop tags as a moving tag evaluation feature value of the stop tags;
calculate an inter-distribution distance that indicates a degree of separation between the moving tag evaluation feature value of the moving tags and the moving tag evaluation feature value of the stop tags; and
determine whether a measurement environment is suitable for a moving tag detection, in which the moving tags are detected while being distinguished from the stop tags, by determining whether the inter-distribution distance is larger than a predetermined threshold value.

5. The tag measurement environment evaluation device according to claim 4, wherein the program is further configured to, when executed by the processor, cause the processor to:
classify the moving tag evaluation values according to a plurality of classes of a measurement environment index that is an index of the measurement environment having a possibility of having an influence on the moving tag detection, and determine the moving tag evaluation feature values for the respective classes of the measurement environment index; and
calculate the inter-distribution distance indicating the degree of separation between the moving tag evaluation feature value for the distribution of the moving tag evaluation values of the moving tags for one of the classes and the moving tag evaluation feature value for the distribution of the moving tag evaluation values of the stop tags for another one of the classes.

* * * * *